US012047337B1

(12) United States Patent
Smetanin et al.

(10) Patent No.: US 12,047,337 B1
(45) Date of Patent: Jul. 23, 2024

(54) GENERATING MEDIA CONTENT ITEMS DURING USER INTERACTION

(71) Applicant: Snap Inc., Santa Monica, CA (US)

(72) Inventors: Sergey Smetanin, London (GB); Roman Golobokov, London (GB); Emily Ann Claudet, London (GB); Dor Ayalon, Glasgow (GB); Vladimir Gordienko, London (GB); Erin Houston, Saratoga Springs, UT (US); Ivan Babanin, London (GB); Timur Zakirov, London (GB); Nikita Demidov, London (GB); Aleksandr Larionov, London (GB); Anna Kovalenko, London (GB); Nikita Belosludtcev, London (GB)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/346,667

(22) Filed: Jul. 3, 2023

(51) Int. Cl.
*G06F 15/16* (2006.01)
*G06F 3/0482* (2013.01)
(Continued)

(52) U.S. Cl.
CPC ............ *H04L 51/10* (2013.01); *G06F 3/0482* (2013.01); *G06T 13/40* (2013.01); *H04L 51/046* (2013.01); *H04L 51/52* (2022.05); *H04N 5/265* (2013.01)

(58) Field of Classification Search
CPC ....... H04L 51/10; H04L 51/52; H04L 51/046; G06F 3/0482; G06T 13/40; H04N 5/265
(Continued)

(56) References Cited

U.S. PATENT DOCUMENTS 5,604,843 A    2/1997   Shaw et al.
5,689,559 A    11/1997   Park
(Continued)

FOREIGN PATENT DOCUMENTS

CN    109863532    6/2019
CN    110168478    8/2019
(Continued)

OTHER PUBLICATIONS

"Bitmoji Customize text", [Online] Retrieved from the Internet: <URL: https://web.archive.org/web/20210225200456/https://support.bitmoji.com/hc/en-US/articles/360034632291-Customize-Text-on-Bitmoji-Stickers>, (captured Feb. 25, 2021), 3 pgs.
(Continued)

*Primary Examiner* — Kaylee J Huang
(74) *Attorney, Agent, or Firm* — SCHWEGMAN LUNDBERG & WOESSNER, P.A.

(57) ABSTRACT

A method includes determining participation in an interaction function by a first user of an interaction system with a second user of the interaction system. The method also includes accessing profile data of the first user, and determining, based on the profile data, whether the first user has captured or designated a first-user self-image for use in the interaction function. In response to determining that the first user has not captured or designated the first-user self-image, the method includes accessing a media content item that includes a character, identifying a head portion of the character in the media content item, replacing the head portion with a placeholder space, and displaying the media content item with the placeholder space in a user interface corresponding to the interaction function.

18 Claims, 13 Drawing Sheets

(51) Int. Cl.
  *G06T 13/40* (2011.01)
  *H04L 51/046* (2022.01)
  *H04L 51/10* (2022.01)
  *H04L 51/52* (2022.01)
  *H04N 5/265* (2006.01)

(58) Field of Classification Search
  USPC .......................................... 709/206, 204, 217
  See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,552,977 B1 * | 2/2020 | Theis ........................ G06T 7/70 |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |

(56) References Cited

U.S. PATENT DOCUMENTS

| | | | |
|---|---|---|---|
| 11,270,491 | B2 | 3/2022 | Monroy-Hernández et al. |
| 11,284,144 | B2 | 3/2022 | Kotsopoulos et al. |
| 2002/0067362 | A1 | 6/2002 | Agostino Nocera et al. |
| 2002/0169644 | A1 | 11/2002 | Greene |
| 2004/0177116 | A1* | 9/2004 | McConn .................. H04L 67/12 709/204 |
| 2005/0162419 | A1 | 7/2005 | Kim et al. |
| 2005/0206610 | A1 | 9/2005 | Cordelli |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2008/0158222 | A1 | 7/2008 | Li et al. |
| 2008/0162649 | A1* | 7/2008 | Lee ...................... G06Q 10/107 709/206 |
| 2009/0016617 | A1 | 1/2009 | Bregman-Amitai et al. |
| 2009/0055484 | A1 | 2/2009 | Vuong et al. |
| 2009/0063645 | A1* | 3/2009 | Casey ................ H04N 21/4788 709/206 |
| 2009/0070688 | A1 | 3/2009 | Gyorfi et al. |
| 2009/0099925 | A1 | 4/2009 | Mehta et al. |
| 2009/0106672 | A1 | 4/2009 | Burstrom |
| 2009/0158170 | A1 | 6/2009 | Narayanan et al. |
| 2009/0177976 | A1 | 7/2009 | Bokor et al. |
| 2009/0202114 | A1 | 8/2009 | Morin et al. |
| 2009/0265604 | A1 | 10/2009 | Howard et al. |
| 2009/0300525 | A1 | 12/2009 | Jolliff et al. |
| 2009/0303984 | A1 | 12/2009 | Clark et al. |
| 2010/0011422 | A1 | 1/2010 | Mason et al. |
| 2010/0023885 | A1 | 1/2010 | Reville et al. |
| 2010/0115426 | A1 | 5/2010 | Liu et al. |
| 2010/0162149 | A1 | 6/2010 | Sheleheda et al. |
| 2010/0203968 | A1 | 8/2010 | Gill et al. |
| 2010/0227682 | A1 | 9/2010 | Reville et al. |
| 2011/0093780 | A1 | 4/2011 | Dunn |
| 2011/0115798 | A1 | 5/2011 | Nayar et al. |
| 2011/0148864 | A1 | 6/2011 | Lee et al. |
| 2011/0239136 | A1 | 9/2011 | Goldman et al. |
| 2012/0113106 | A1 | 5/2012 | Choi et al. |
| 2012/0124458 | A1 | 5/2012 | Cruzada |
| 2012/0130717 | A1 | 5/2012 | Xu et al. |
| 2012/0166532 | A1* | 6/2012 | Juan .................... G06Q 30/0224 709/204 |
| 2013/0103760 | A1 | 4/2013 | Golding et al. |
| 2013/0201187 | A1 | 8/2013 | Tong et al. |
| 2013/0249948 | A1 | 9/2013 | Reitan |
| 2013/0257877 | A1 | 10/2013 | Davis |
| 2014/0043329 | A1 | 2/2014 | Wang et al. |
| 2014/0055554 | A1 | 2/2014 | Du et al. |
| 2014/0125678 | A1 | 5/2014 | Wang et al. |
| 2014/0129343 | A1 | 5/2014 | Finster et al. |
| 2014/0245183 | A1* | 8/2014 | Lewis ............. H04N 21/25891 715/753 |
| 2015/0206349 | A1 | 7/2015 | Rosenthal et al. |
| 2016/0134840 | A1 | 5/2016 | Mcculloch |
| 2016/0150009 | A1* | 5/2016 | LeRoy ................. H04L 67/1095 709/204 |
| 2016/0234149 | A1 | 8/2016 | Tsuda et al. |
| 2016/0364106 | A1* | 12/2016 | Koum .................. H04L 67/306 |
| 2017/0080346 | A1 | 3/2017 | Abbas |
| 2017/0087473 | A1 | 3/2017 | Siegel et al. |
| 2017/0113140 | A1 | 4/2017 | Blackstock et al. |
| 2017/0118145 | A1 | 4/2017 | Aittoniemi et al. |
| 2017/0199855 | A1 | 7/2017 | Fishbeck |
| 2017/0235848 | A1 | 8/2017 | Van Dusen et al. |
| 2017/0310934 | A1 | 10/2017 | Du et al. |
| 2017/0312634 | A1 | 11/2017 | Ledoux et al. |
| 2018/0047200 | A1 | 2/2018 | O'hara et al. |
| 2018/0113587 | A1 | 4/2018 | Allen et al. |
| 2018/0115503 | A1 | 4/2018 | Baldwin et al. |
| 2018/0198743 | A1 | 7/2018 | Blackstock et al. |
| 2018/0225703 | A1* | 8/2018 | State .................. G06Q 30/0242 |
| 2018/0315076 | A1 | 11/2018 | Andreou |
| 2018/0315133 | A1 | 11/2018 | Brody et al. |
| 2018/0315134 | A1 | 11/2018 | Amitay et al. |
| 2019/0001223 | A1 | 1/2019 | Blackstock et al. |
| 2019/0052934 | A1* | 2/2019 | Groves ................ H04N 21/632 |
| 2019/0057616 | A1 | 2/2019 | Cohen et al. |
| 2019/0097958 | A1 | 3/2019 | Collet et al. |
| 2019/0188920 | A1 | 6/2019 | Mcphee et al. |
| 2019/0280997 | A1 | 9/2019 | Baldwin et al. |
| 2020/0306637 | A1 | 10/2020 | Baldwin et al. |
| 2020/0372127 | A1 | 11/2020 | Denton et al. |
| 2020/0410575 | A1 | 12/2020 | Grantham et al. |
| 2021/0074047 | A1 | 3/2021 | Sheth et al. |
| 2021/0089179 | A1 | 3/2021 | Grantham et al. |
| 2021/0104087 | A1 | 4/2021 | Smith et al. |
| 2021/0168108 | A1 | 6/2021 | Antmen et al. |
| 2021/0170270 | A1 | 6/2021 | Brody et al. |
| 2021/0192823 | A1 | 6/2021 | Amitay et al. |
| 2021/0209825 | A1 | 7/2021 | Assouline et al. |
| 2021/0225058 | A1 | 7/2021 | Chand et al. |
| 2021/0240315 | A1 | 8/2021 | Alvi et al. |
| 2021/0243482 | A1 | 8/2021 | Baril et al. |
| 2021/0243503 | A1 | 8/2021 | Kotsopoulos et al. |
| 2021/0266277 | A1 | 8/2021 | Allen et al. |
| 2021/0281897 | A1 | 9/2021 | Brody et al. |
| 2021/0285774 | A1 | 9/2021 | Collins et al. |
| 2021/0306290 | A1 | 9/2021 | Voss |
| 2021/0306451 | A1 | 9/2021 | Heikkinen et al. |
| 2021/0337277 | A1* | 10/2021 | Scott-Green ..... H04N 21/23424 |
| 2021/0385179 | A1* | 12/2021 | Heikkinen .............. H04W 4/12 |
| 2021/0385180 | A1 | 12/2021 | Al Majid et al. |
| 2021/0397645 | A1* | 12/2021 | Wang .................. G06F 3/04847 |
| 2021/0405831 | A1 | 12/2021 | Mourkogiannis et al. |
| 2021/0409535 | A1 | 12/2021 | Mourkogiannis et al. |
| 2022/0012929 | A1 | 1/2022 | Blackstock et al. |
| 2022/0148276 | A1* | 5/2022 | Golobokov ............. G06T 13/40 |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

(56) References Cited

OTHER PUBLICATIONS

"Instant Comics Starring You and Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.

Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable- geofilters-2448152>, (Nov. 18, 2016), 6 pgs.

* cited by examiner

GENERATING MEDIA CONTENT ITEMS DURING USER INTERACTION

TECHNICAL FIELD

The present disclosure relates generally to generating media content, and more specifically to generate media content during user interaction with other users.

BACKGROUND

The popularity of electronic messaging, particularly instant messaging, continues to grow. Users increasingly share media content items such as electronic images and videos with each other. Users are communicate with each other using interaction applications on their mobile phones. Users also utilize mobile devices to communicate with each other using various systems that include messaging functionality (also referred to as chat functionality) suitable for sharing such messages.

Multiple computer-implemented applications exist that permit users to share content with other users through messaging clients running on user systems. Some of such computer-implemented applications can be designed to run on a mobile device such as a phone, a tablet, or a wearable device. The backend service provided on a server can perform operations that may require resources greater than is reasonable to perform at a user system (e g., storing large amounts of data or performing computationally expensive processing).

A messaging application running on a user system provides a user interface that allows a user to send and receive messages. The user interface enables the user to include various types of message content, such as text or image content, in a message. The user interface provides a message composition area where the user can add and edit message content before a message is transmitted to another user. For example, the user can type text to the message composition area, and then select a user-selectable element in the form of a send button to cause transmission of a message (that includes the desired text) to another user.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
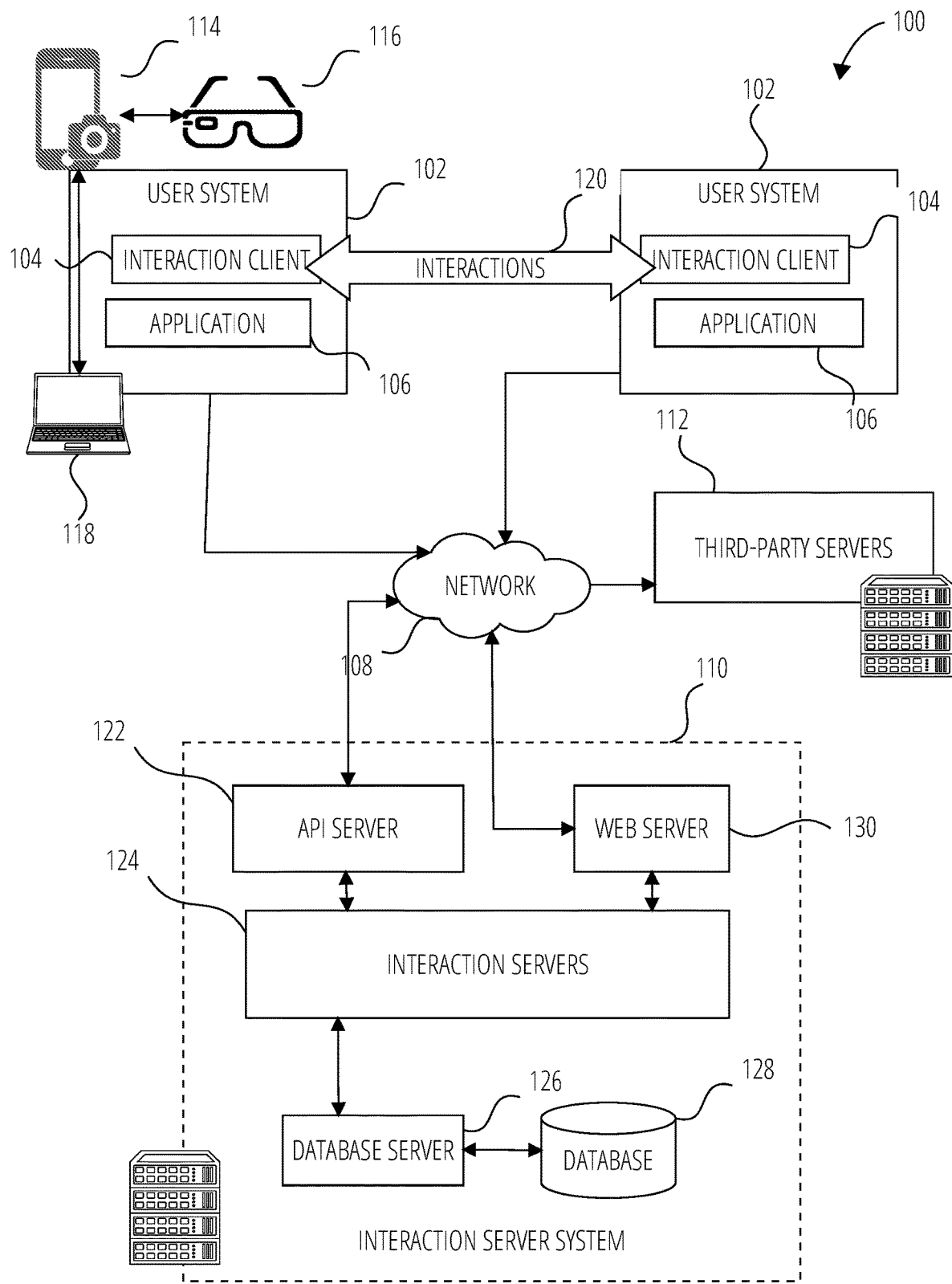
FIG. 1 is a diagrammatic representation of a networked environment in which the present disclosure may be deployed, according to some examples.

In some cases, users have not taken a self-image of their own head, nor has another user's head to apply to a media content item. Traditional systems are not able to replace a head of a media content item (such as a still image, video, or animation of an individual or character) with a self-image of a person's head. For example, the user can be exchanging conversation messages with another user (such as a friend) in a chat window. However, the user may not have taken a self-image nor is able to use the head of the friend to apply to media content items. In such circumstances, the system does not have the ability to provide a personalized media content item to send to the friend in the chat window where the head of the media content item could be replaced with the user's head or friend's head.

Example interaction systems described herein enable users to send such media content items even if the user does not have a user's head to apply (such as if the user has not completed the onboarding process of taking a self-image to personalize such media content items or has an image of the friend's head available for the media content item). The system determines that a user is interacting with another user (such as exchanging messages in a chat window with a friend). The system then accesses a user's profile. After determining that the user has not completed the onboarding process of capturing or designating a self-image for the user's profile, the system also checks whether the friend in the chat completed the onboarding process of capturing or designating a self-image. The system also checks the friend's profile to determine whether the friend has allowed other users to use the friend's self-image in media content items.

If a self-image of the user or friend is unavailable, the system then accesses sets of media content items and replaces the head portion of the individual or character that is shown in the media content items with a placeholder space, such as a blank oval. The set of media content items with the blank oval are displayed in the user interface and can be sent to the friend.

If the user chooses to send a media content item with a blank head, the system displays the media content item in the chat window for both the user and the friend. The chat window displays a user selectable element (such as a banner or embedded within the media content item so that the user can select the media content item itself) that, when selected, initiates opening of the camera to begin the onboarding process of taking a self-image. Upon user completion of the onboarding process, the system automatically updates the media content item sent to the chat and other media content items that have not yet been sent to the chat by replacing the blank space with the user's head.

Advantageously, the systems and methods described herein enable users to use these media content items without having completed the onboarding process of taking a self-image. Moreover, the systems encourage users to complete the onboarding process by providing an easily accessible user interface icon that automatically opens the camera of a user's mobile device so the user can take a self-image.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an electronic interaction process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, sending or receiving content items, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between other interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different applications 106 (or applets) can vary based on how the menu is launched by the user (e.g., from a conversation interface or from a non-conversation interface).

System Architecture

Figure 2:
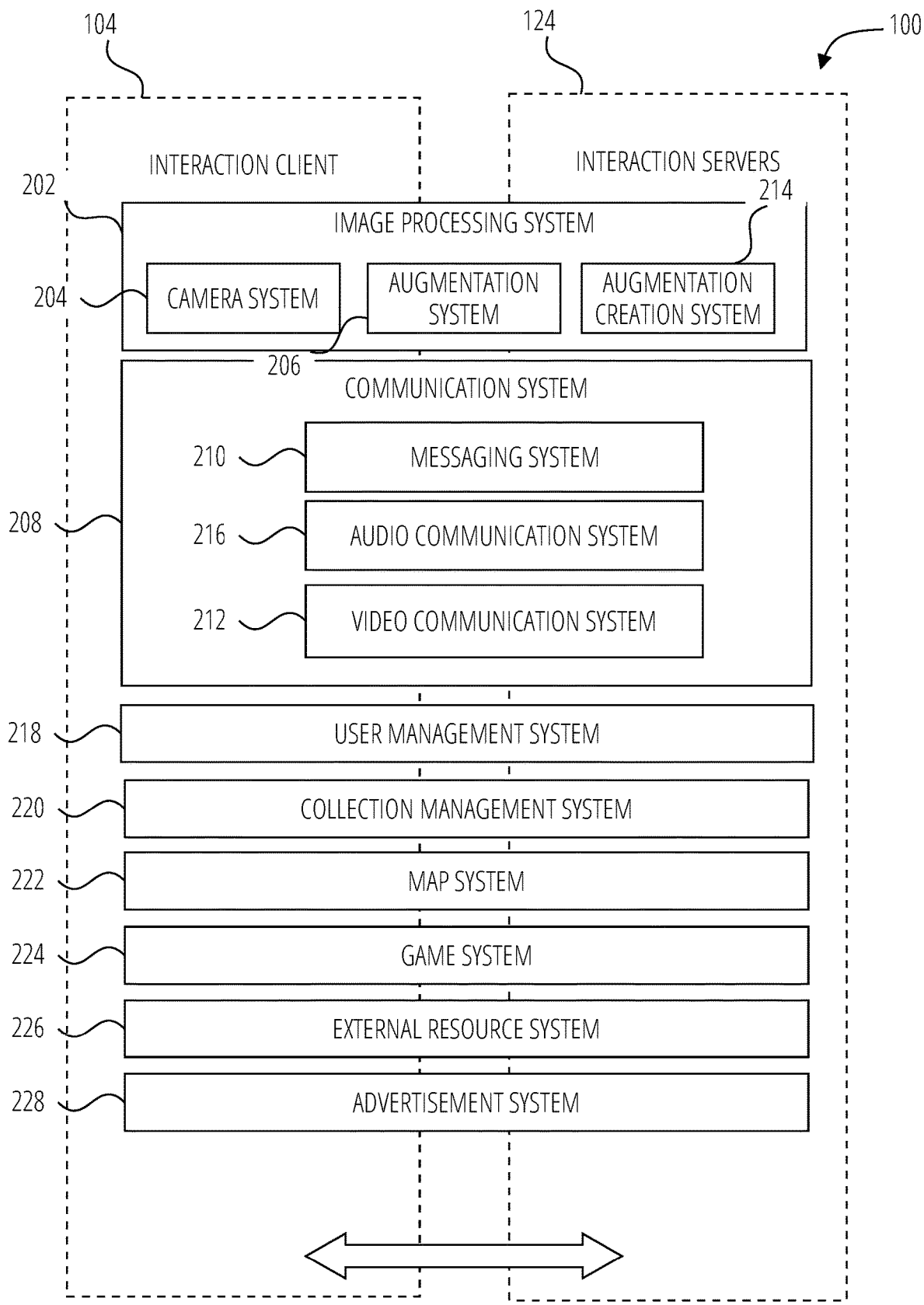
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1302 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100. The user management system 218 initiates the onboarding process of capturing or designating a self-image of the user via a camera system of an interaction system, accesses user profile data to determine whether users have completed the onboarding process and enabled other friends to use their self-image, identifies and replaces head portions of media content items, provides user interface features for users to send content items with blank faces and/or initiate the onboarding process, and updated media content items with the captured or designated self-image.

The user management system 218 stores user profile data. User profile databases can store self-images of users, such as a self-image to use on a head portion of a media content item. The user management system 218 accesses user profile data to determine whether users have taken a self-image for the purposes of generating a personalized media content item with a replaced head portion. The user management system 218 accesses user profile data to determine whether users have enabled other users (such as friends) to use their self-image in media content items, such as enabling a friend to send a media content item with a head image of the user.

The user management system 218 accesses sets of media content items, identifies head portions, and replaces the original head of a character in the media content item with something else, such as a placeholder space or a head of an actual user. The user management system 218 places selectable user interface elements, such as a banner or an embedded element within the media content item, to a user interface that when selected causes initiation of a camera system for taking a self-image. The user management system 218 causes changes to the user interface such as apportioning a portion of the user interface for the media content items and displaying the set of media content items.

The user management system 218 determines how the set of media content items are to be displayed. If users have not taken a self-image and does not have the ability to apply a friend's self-image, then the user management system 218 uses a placeholder space for the head portion in media content items. Upon a user or friend taking the self-image, the user management system 218 updates media content items with the taken self-image.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

Data Architecture

Figure 3:
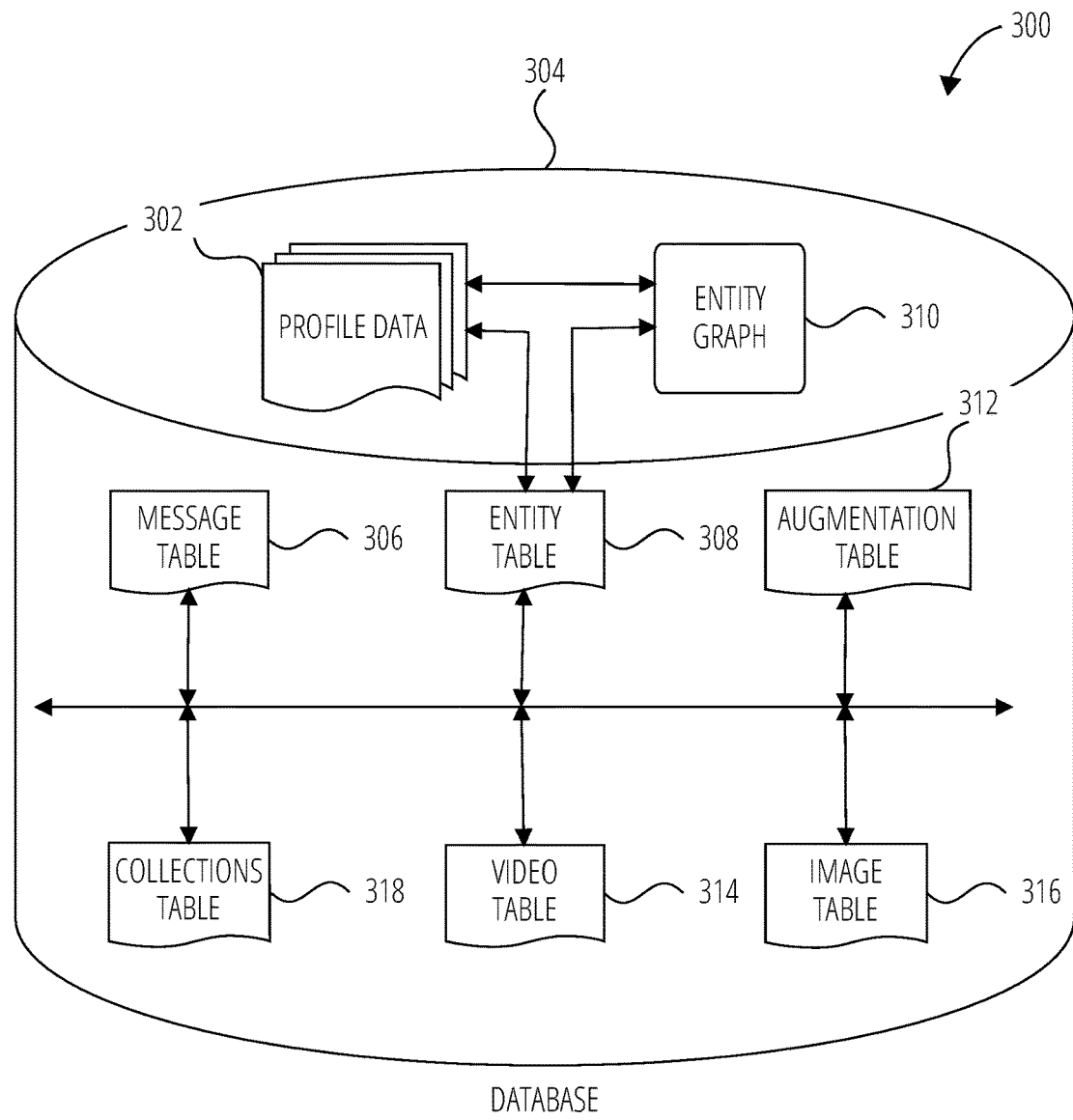
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Determining Media Content Items for Display

Figure 4:
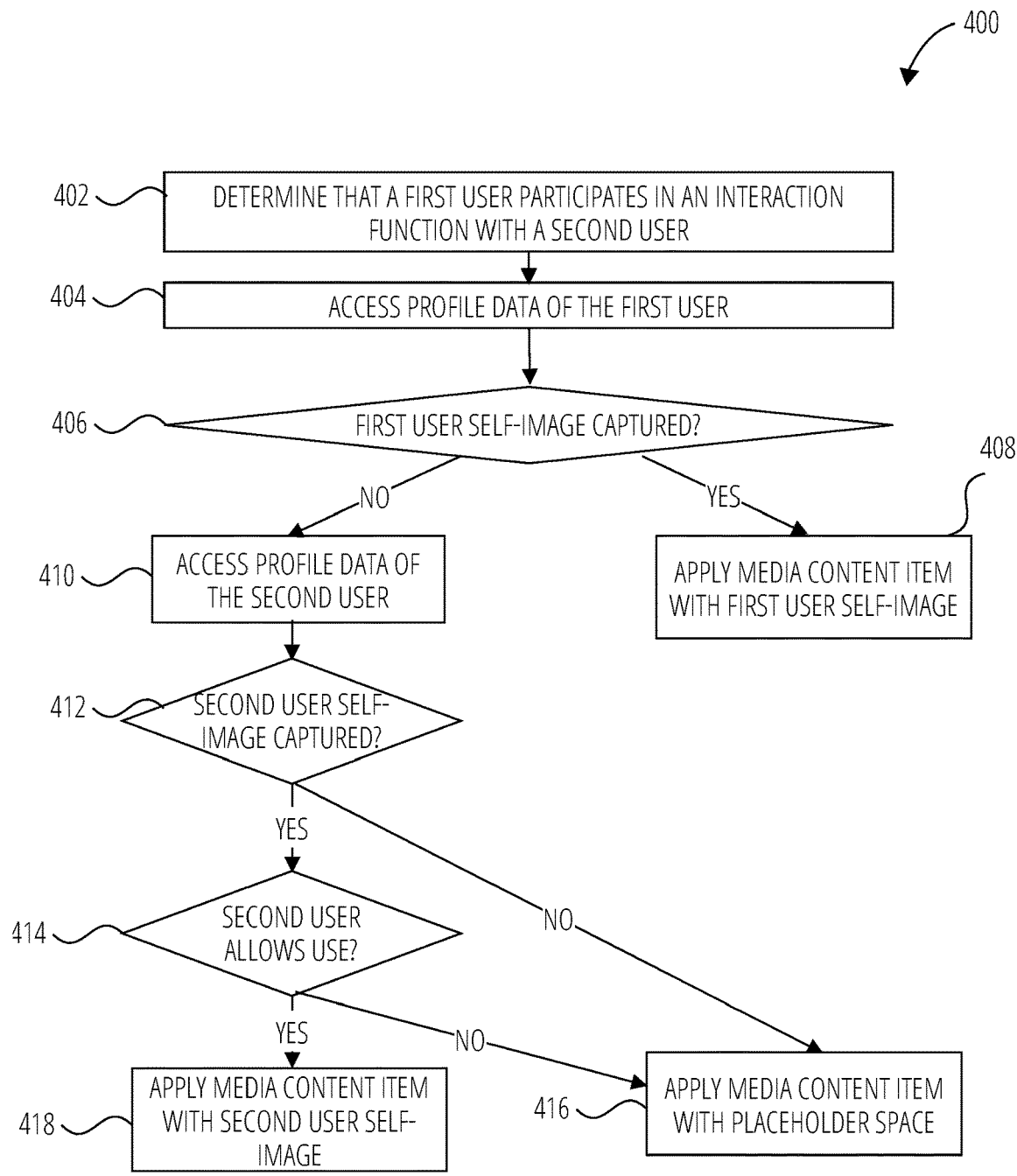
FIG. 4 illustrates a flowchart for determining a media content item to display for an interaction function, according to some examples.

FIG. 4 illustrates a flowchart 400 for determining the media content item to display for the interaction function, according to some examples. Although the example flowchart 400 depicts a particular sequence of operations, the sequence may be altered without departing from the scope of the present disclosure. For example, some of the operations depicted may be performed in parallel or in a different sequence that does not materially affect the function of the flowchart 400. In other examples, different components of an example device or system that implements the flowchart 400 may perform functions at substantially the same time or in a specific sequence.

At operation 402, the system, such as the interaction client 104 or the user management system 218, determines that a first user is participating in an interaction function with a second user. Interaction functions include a chat window where messages, stickers, emojis, and other media content items are shared between users. Interaction functions include users sending photos or videos to friends, either individually or in groups, which can be edited with text, stickers, filters, and drawings before being sent. Interaction functions include videos, audio, text, or other communications that disappear after certain conditions are met, such as being viewed once or setting a time limit, creating a more ephemeral and casual sharing experience.

Interaction functions include a collection of videos, messages, stickers, or other media content items that are visible to friends for a certain period of hours (e.g., 24 hours).

Interaction functions include displaying media content items from other users, such as publishers, creators, and influencers, where users can explore and subscribe to different channels to receive updates on their favorite content. Interaction functions include map and location functions, such as users sharing their location with friends and viewing their friends' locations on a map, or exploring a map with points of interest by other users categorized by location and events.

Interaction functions include various filters and content augmentations to enhance images, videos, or other media content items to share with others, such as by adjusting the color or appearance or adding interactive elements such as animations and facial transformations, in real-time. Interaction functions include saving favorite media content items with other users in a private archive, where users can access these saved media content items later, edit them, or share them with friends. Interaction functions include personalized avatars which can be used as a profile picture to be viewed by others and in stickers, chat, and image/video decorations. Interaction functions include multiplayer games that users can play with their friends directly within the user interface of the system to share messages and media content items.

At operation 404, the system accesses profile data of the first user. Profile data of users includes personal information, such as a name, email address, phone number, date of birth, gender, education, occupation, interests, and/or the like. Profile data of users includes profile pictures, cover photos, biographies, and any other customizations made by the user to their online profiles. Profile data of users includes connections and relationships with other users, such as a user's friends, followers, and connections, as well as the groups and pages they follow or like. Profile data of users includes content users share, such as text, direct messages, photos, videos, and links, and direct messages, comments, and any other interactions users have within the platform. Profile data of users includes location data, such as the user's city or precise GPS coordinates, such as when using location-based features or when sharing content with location tags. Profile data of users includes how users interact with the platform's services, such as the content they view, like, share, or engage with, as well as the features they use and the duration of their sessions. Profile data of users includes data about the devices used to access their services, including device model, operating system, browser type, IP address, and unique identifiers like device IDs or cookies.

In some examples, other users that are associated with the user (such as within an interaction function of the interactive system) include followers or friends, where users can follow or be followed by others, or form some form of relationship such that other users can see certain information, such as each other's posts on their feeds. In some examples, the other users can include "close" or "best" friends that can create a relationship to share additional information not available to others, such as private posts, targeted sharing of content, and/or the like. In some examples, other users are users mentioned or tagged in the user's posts, comments, chat messages, or other communication that draws the attention of the tagged user and/or can initiate conversations or discussions. In some examples, other users are users that are involved in a message chat with the user, such as a private messaging feature that allows users to send messages directly to one another or within group chats among many users. In some examples, other users are users that joined a group based on shared interests or common goals. Within these groups, users can interact and form relationships based on the group's focus and/or share information among group members. In some examples, other users are users who express support for users, such as through likes, comments, or shares, or vice versa. In some examples, other users are influencers or brand ambassadors that have established large followings and are seen as authorities or trendsetters in their niches. In some examples, other users are collaborators working together on projects or create content together.

The system determines, based on the profile data, whether the first user has captured or designated a self-image for use in the interaction function and/or media content item. In some examples, the system determines that the user has not captured or designated a self-image by looking for a self-image in the profile data. In some examples, the system looks in a particular storage location in the database that is designated for user self-images to be used in media content items.

A self-image includes an image in which the face of the user appears. A self-image can include a self-taken image (such as a "selfie"), a headshot, a profile photo, a video still frame, and/or the like.

At operation 406, the system determines whether the first user captured the self-image. In response to determining that the first user has captured the self-image for the purposes of applying to media content items, at operation 408, the system applies the media content to the interaction function with the first user's self-image. In some examples, the first user's self-image replaces the head of a character displayed in the media content item and is sent to a friend who is also in the chat window.

At operation 406, in response to determining that the first user has not captured or designated the self-image for the purposes of applying to media content items, at operation 410, the system accesses profile data of the second user. Then at operation 412, the system determines whether the second user captured or designated a self-image to use for media content items. In some examples, the system accesses profile data for a group of other users that the user is participating in an interaction function with to make such determinations described herein.

In response to determining that the second user has not captured or designated the self-image for the purposes of applying to media content items, at operation 416, the system generates and applies the media content item to the interaction function with a placeholder space. In some examples, the system replaces the head of a character displayed in the media content item with a placeholder space, such as a blank oval.

At operation 412, in response to determining that the second user has captured or designated the self-image for the purposes of applying to media content items, at operation 414, the system determines whether the second user enabled others to use the other user's self-image in media content items. At operation 414, in response to determining that the second user has not enabled others to use the other user's self-image, at operation 416, the system generates and applies the media content item to the interaction function with a placeholder space. At operation 414, in response to determining that the second user has enabled others to use the other user's self-image, at operation 418, the system applies the self-image of the second user to the media content item.

Applying a Placeholder Head for Media Content Items

Figure 5:
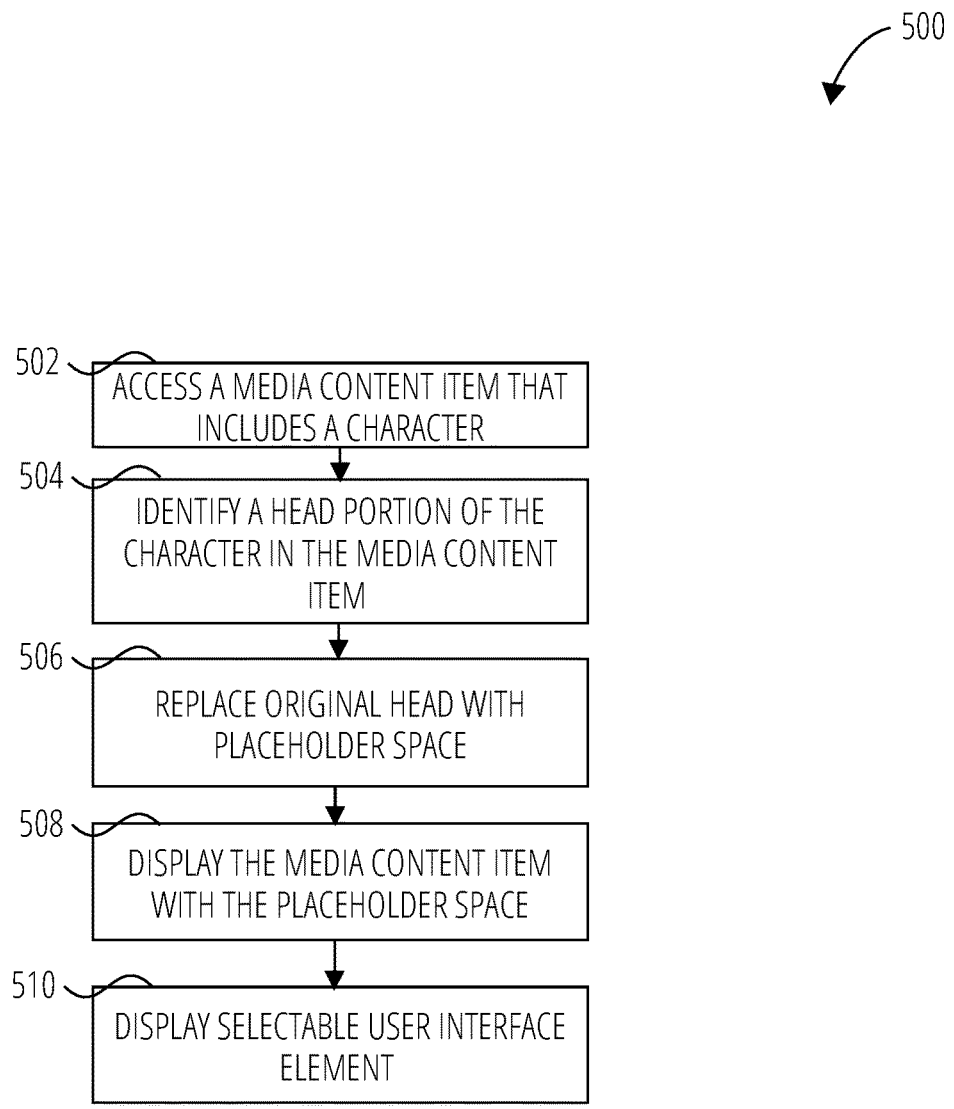
FIG. 5 illustrates a flowchart for applying a placeholder head in a media content item, according to some examples.

FIG. 5 illustrates a flowchart 500 for applying a placeholder head in a media content item, according to some examples. Although the example flowchart 500 depicts a particular sequence of operations, the sequence may be altered without departing from the scope of the present disclosure. For example, some of the operations depicted may be performed in parallel or in a different sequence that does not materially affect the function of the flowchart 500. In other examples, different components of an example device or system that implements the flowchart 500 may perform functions at substantially the same time or in a specific sequence.

At operation 502, the system, such as the interaction client 104 or the user management system 218, accesses a media content item that includes at least one character, such as a person or individual. At operation 504, the system identifies a head portion of the character in the media content item. The system can apply an object detection method that is trained to recognize specific objects, such as faces or heads. Certain object detection methods can scan the image at different scales and positions to identify the object of interest.

In some examples, the system applies techniques that extract features from the image, which capture the distribution of gradient directions in localized regions, which are then fed into a classifier to detect objects like heads or faces. In some examples, the system applies Convolutional Neural Networks (CNN), which include multiple layers that learn to recognize features in the input image. Pre-trained CNN models can be fine-tuned for head or face detection tasks by training on labeled datasets. In some examples, the system applies a real-time object detection technique that uses a single CNN to both propose object regions and classify them simultaneously, which can be trained for head detection tasks using labeled datasets. In some examples, the system can apply another real-time object detection method that processes the entire image in a single pass by dividing the input image into a grid and assigning bounding boxes and class probabilities to each grid cell.

In some examples, the system identifies and/or applies the appropriate algorithm depending on factors such as the complexity of the task, available computational resources, and the desired level of accuracy and speed.

At operation 506, the system replaces the head portion with a placeholder space. The system can replace the head of a character, such as an individual or animation, with other content, such as a placeholder space or another individual's head. The system can employ advanced image processing techniques and/or machine learning techniques to swap the head of a character in a media content item. In some examples, the system swaps the head/placeholder space by detecting facial landmarks in the target image and then aligning the image with landmarks on the other image or the placeholder space by applying an affine transformation or thin-plate spline warping. Then, the new head or placeholder space is seamlessly blended into the target image using seamless cloning and/or the like. In some examples, the system detects facial landmarks on a target image and aligns the facial landmarks with landmarks for the placeholder space.

In some examples, the system swaps the head/placeholder space by applying Generative Adversarial Networks (GANs). The models are trained to learn a mapping from one image domain to another. By training a GAN on paired images with swapped heads or on an image with a head and an image with a placeholder space, the model can learn to replace the head of a person in an image with another person's head or placeholder space while maintaining the original image's appearance.

In some examples, the system swaps the head by using autoencoder-based architectures, where separate encoder-decoder networks are trained for the source and target subjects. The encoders learn to extract facial features, while the decoders learn to reconstruct the faces or placeholder spaces. To perform head swapping, the source person's head is encoded and then decoded using the target person's decoder placeholder space, generating a new image with the target person's head or placeholder space.

In some examples, the system swaps the head by segmenting the faces into semantic regions (e.g., eyes, nose, mouth) using techniques like fully convolutional networks. The segmented facial regions from the source and target images can then be aligned and combined, followed by blending to create a seamless result.

The placeholder space includes a portion of the media content item that is saved to be replaced by the head of a user. In some examples, the placeholder space includes an empty portion, such as an empty oval shape, empty square or circle, dotted lines, colored boxes or shapes (such as a gray box), transparent portions, a checkerboard pattern, placeholder icons, generic symbols, and/or the like.

At operation 508, the system displays the media content item with the replaced head portion in a user interface corresponding to the interaction function. In some examples, the system displays the media content item in a chat window where messages are exchanged between users. The system displays the media content item in the chat window at a first interaction client of the user and a second interaction client of the other user in the chat window. In some examples, the media content item is displayed with other media content items from other users, where the media content items are from publishers, creators, and influencers and where users can explore and subscribe to different channels to receive updates on their favorite content.

At operation 510, the system displays a selectable user interface element, such as with the media content item. In some examples, the system embeds the selectable user interface element within the media content item. The selectable user interface element is embedded within the media content item such that the selectable user interface element initiates an action (such as opening a camera system to capture a self-image) in response to a user selection of at least a portion of the media content item. In some examples, the system displays a selectable banner or icon.

Replacing Placeholder Heads with a User's Head in Media Content Items

Figure 6:
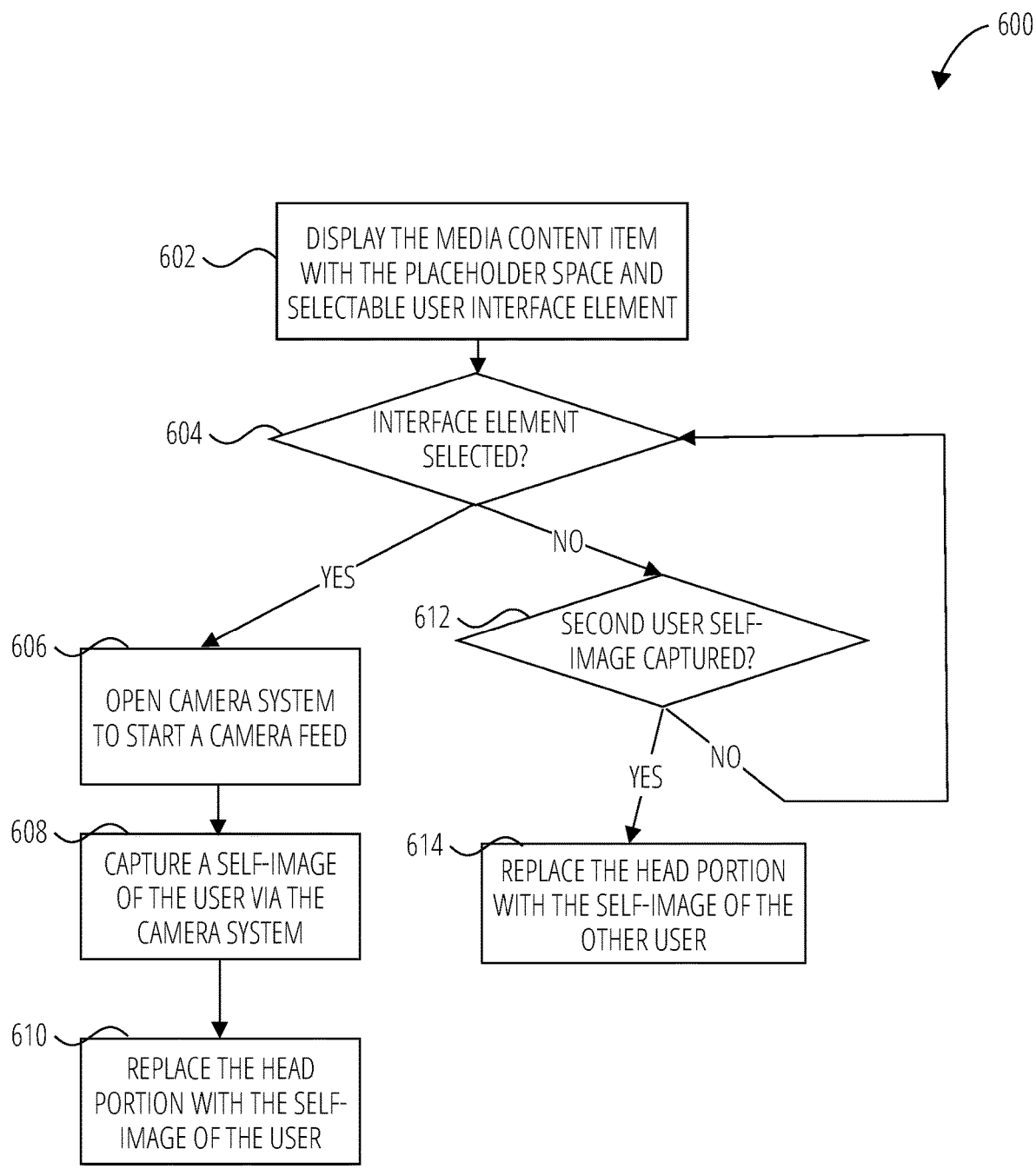
FIG. 6 illustrates a flowchart for replacing the placeholder head with a user's head in a media content item, according to some examples.

FIG. 6 illustrates a flowchart 600 for replacing the placeholder head with a user's head in a media content item, according to some examples. Although the example flowchart 600 depicts a particular sequence of operations, the sequence may be altered without departing from the scope of the present disclosure. For example, some of the operations depicted may be performed in parallel or in a different sequence that does not materially affect the function of the flowchart 600. In other examples, different components of an example device or system that implements the flowchart 600 may perform functions at substantially the same time or in a specific sequence.

At operation 602, the system displays a media content item with the placeholder space. The system also displays a selectable user interface element, such as a banner or embedded with the media content item.

At operation 604, the system determines if the user selects the selectable user interface element. At operation 604, in response to the user selecting the selectable user interface element, at operation 606, the system opens a camera system to initiate a camera feed. The system displays the camera feed from the camera system on the interaction client of the first user start a camera feed. At operation 608, the system captures a self-image of the first user, such as in response to the user aligning the user's head on the camera feed and selecting a button to capture an image.

At operation 610, the system replaces the head portion that was currently being displayed as a placeholder space with the self-image of the first user. In some examples, the media content item with the placeholder space was posted, sent to a chat window, or otherwise selected for the interaction function. At operation 610, the system replaces the media content item that was used in the interaction function and that includes the placeholder space with a media content item that includes the first user's self-image.

At operation 604, if the system has not received a user selection of the selectable user interface element, at operation 612, the system determines whether a self-image was captured by a second user, the second user being associated with the interaction function. At operation 604, in response to determining that a self-image was captured by the second user, at operation 614, the system replaces the head portion with the self-image of the second user. At operation 604, in response to determining that a self-image was not captured by the second user, the system returns to operation 604 to check whether the user selected the selectable user interface element.

In some examples, the user has captured a self-image and the system checks whether the other user connected with the interaction function (friend also in the chat window) has captured a self-image. In response to determining that the other user has also captured the self-image, the system identifies media content items with two head portions. For each of the identified media content items with two head portions, the system replaces a first head portion in the media content item with a head portion of the first user, and a second head portion in the media content item with a head portion of the second user. The system displays the media content items with the replaced two head portions in the chat window.

Example User Interface Diagrams

Figures 7, 8:
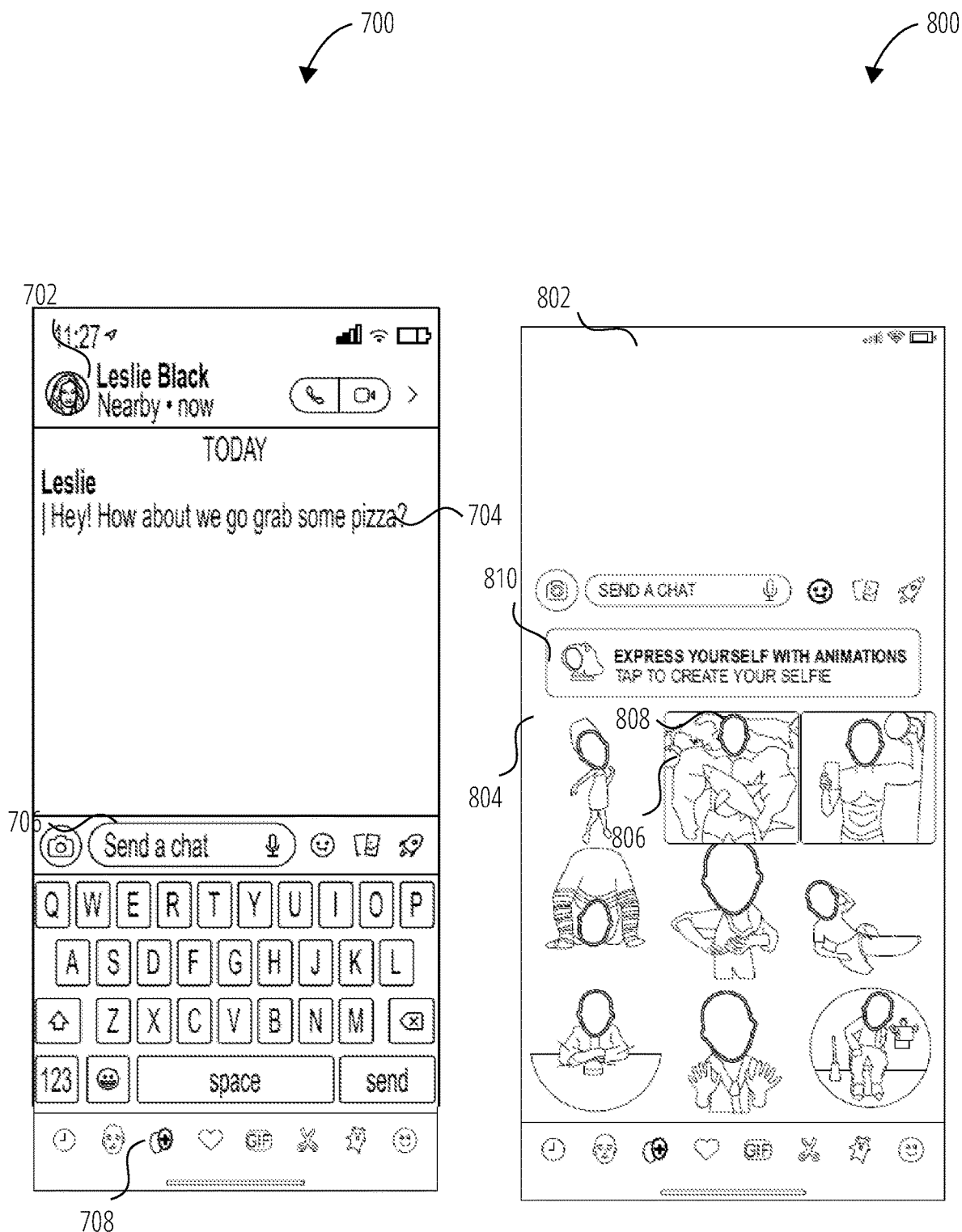
FIG. 7 is a user interface diagram displaying a chat window between a first user and a second user, according to some examples.
FIG. 8 is a user interface diagram displaying an apportioned section of the user interface for displaying a set of media content items, according to some examples.

FIG. 7 is a user interface diagram 700 displaying a user interface for a second user 702 in a chat window 704 with a first user, according to some examples. The first user and the second user 702 exchanges messages within this chat window 704. In some examples, the second user asks if the first user would like to "go grab some pizza."

The user interface includes a selectable user interface element 708 that enables users to add a media content item to the chat window. In some examples, the media content item includes a character (such as an animation or an individual) where a head of the character shown in the media content item is replaced with a head of the user or a placeholder space. In the example of FIG. 7, the first user and second user 702 has not completed taking a self-image to use for the media content item. Thus, the selectable user interface element 708 includes an image indicating that the media content items will have placeholder spaces.

Upon user selection of the selectable user interface element 708, the system initiates displays of the media content items that the user can select to add to the chat window 706. The media content items can include an image or video of the user's head or placeholder space replacing the original head of the character in the media content item.

The user interface includes a plurality of different media content items to select from. The media content items include:

Emojis that are small images or icons that represent emotions, reactions, or objects.

Stickers are larger images or animations that can be sent in a chat window.

Images or photographs can be sent to other users to share visual information or document a particular event.

Video clips can be used to share recorded content or document a particular event.

Audio messages can be shared to communicate audible communication.

Graphics Interchange Formats (GIFs) are short animations that can be used to add humor or express emotions.

In response to determining that the user has not captured a self-image for use in media content items, the system accesses a set of media content items that include a character, identify a head portion of the character in the media content item, and replace the head portion with a placeholder space.

FIG. 8 is a user interface diagram 800 displaying an apportioned section of the user interface for the set of media content items, according to some examples. Portion 802 of the user interface is part of the chat window, which originally took a larger portion of the user interface (for example FIG. 7). The system apportions a section of the user interface, such as portion 804, to make space for the set of media content items.

The set of media content items are assessed to identify a head portion of the character 806 displayed within the media content item. The head portion is replaced with a placeholder space 808, given that the user has not taken a self-image. In some cases, the media content items are originally generated with a placeholder face section. Each media content item is selectable by the user to include in the chat. The user interface includes a selectable banner 810 that when selected by the user, initiates opening of a camera system to begin onboarding of the user of taking a self-image.

The system generates a graphical user interface and/or graphical user interface data that optimizes valuable user interface real estate. For example, the system provides a user interface where upon a selection of the user to display a set of media content items with placeholder spaces on the head of the character, the system reduces the size of a portion of the user interface, such as the chat window, and apportions the unused space for the display of the set of media content items. Moreover, the system displays a selectable banner 810 in between the chat window and the set of media content items, whereby in response to a user selection of the selectable banner, the system directly initiates the opening of the camera system for the user to take a self-image. Furthermore, the system displays a selectable user interface element near, adjacent to, or embedded within a selected media content item that is already in the chat window that, in response to a user selection, initiates opening of the camera system for the user to take a self-image. Moreover, the selectable user interface element follows the media content item in the chat window as the user scrolls through the chat window and/or as new messages are added to the chat.

Such an improved display interface allows a user to more quickly access desired data stored or features available in the mobile application and/or an external database, such as displaying the set of media content items on a mobile phone while also viewing a chat window between users, or a single user selectable interface element that initiates the start of the camera system for the user to take a self-image, which upon such action, the system updates the placeholder spaces for the media content items to the head of the user (both or either the selected media content items already in the chat window and for the set of media content items available for the user to continue to add to the chat). As such, the selectable user interface element launches one or more applications or systems, such as a camera system, to provide further functionality than is typically available in a chat window.

Advantageously, the specific and practical manner of displaying the limited set of information to the user via the apportioning of the chat window improves the technical problem for the user interface in electronic devices over conventional systems by enabling the user to be able to view both the chat window and the set of media content items on a single user interface, and/or more quickly sign up to use the user's self-image as the head of characters in the media content items. Accordingly, such features improve the speed of the user's navigation through various views and windows. The user is saved from navigating in between chat windows and displays of media content items, let alone having to save a copy of a potential media content item from another window or another website/application locally to then attach back to the chat window. Moreover, the user is saved from having to exit from the chat window, click through icons to identify a camera system option to take a self-image, capture only the head of the self-image, and to replace the head of characters in media content items to send to the chat window. Moreover, traditional systems do not have an option to update media content items that have already been sent to the chat after a user has taken the self-image.

The system determines a number of recommended media content items to display based on a characteristic of the interaction client that the user is using. The interaction system can limit a number of media content items to display based on screen size. In some examples, the interaction system varies the number based on whether the interaction client is a mobile device or a laptop screen, or other user computing system type.

In some examples, the system filters out media content items that include a plurality of head portions and/or media content items that are specific to a particular gender or age group to identify the initial set of media content items.

Figure 9:
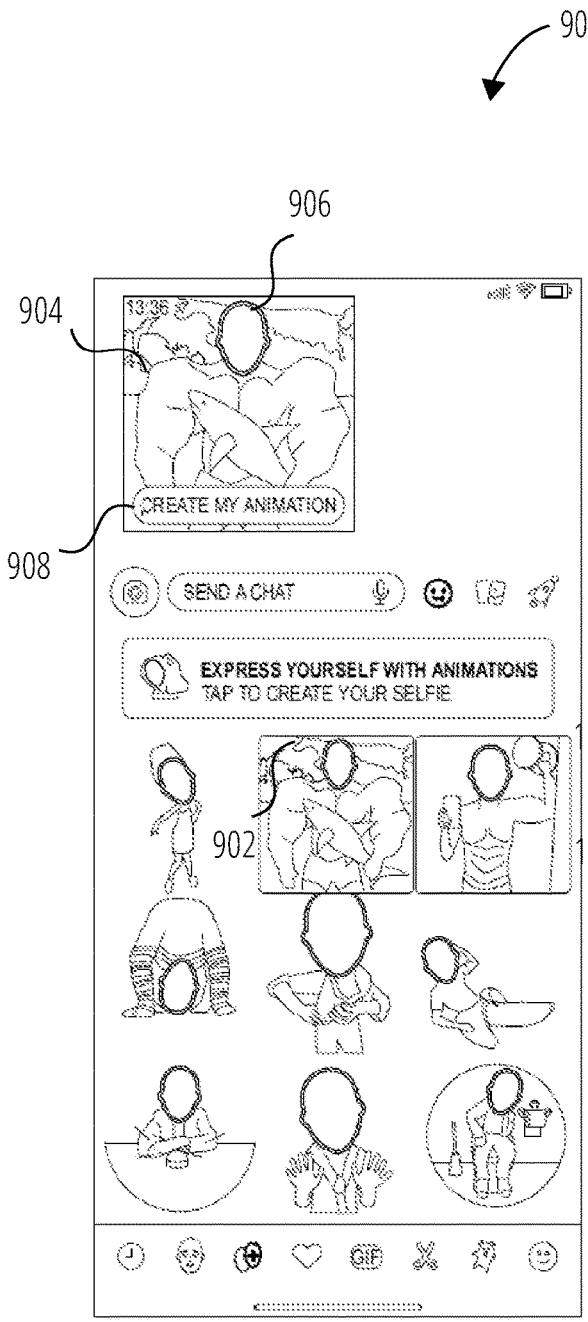
FIG. 9 is a user interface diagram displaying a selected media content item in a chat window, according to some examples.

FIG. 9 is a user interface diagram 900 displaying a selected media content item in a chat window, according to some examples. From FIG. 8, the user selects the media content item 902, and in FIG. 9, the media content item 904 is displayed in the chat window with the placeholder space 906. The media content item 904 includes a selectable user interface element 908, such as an embedded interface element within the media content item. The user selectable user interface element moves with the media content item within the chat window. In some examples, if follow-on messages are sent after the media content item 904 is added to the chat, the media content item 904 moves in the direction of older messages (such as upward) and the selectable user interface element moves along with the media content item.

In response to a user selection of the selectable user interface element, the system initiates a camera system that begins display of a camera feed to the user. The user takes a self-image and opts-in to applying his or her face onto the media content items.

In some examples, the system disables the option to save the media content item with the placeholder space onto a local memory, which is typically enabled for other media content items. In some examples, the system displays a search bar to search for other media content items that enable a placeholder space.

Figure 10:
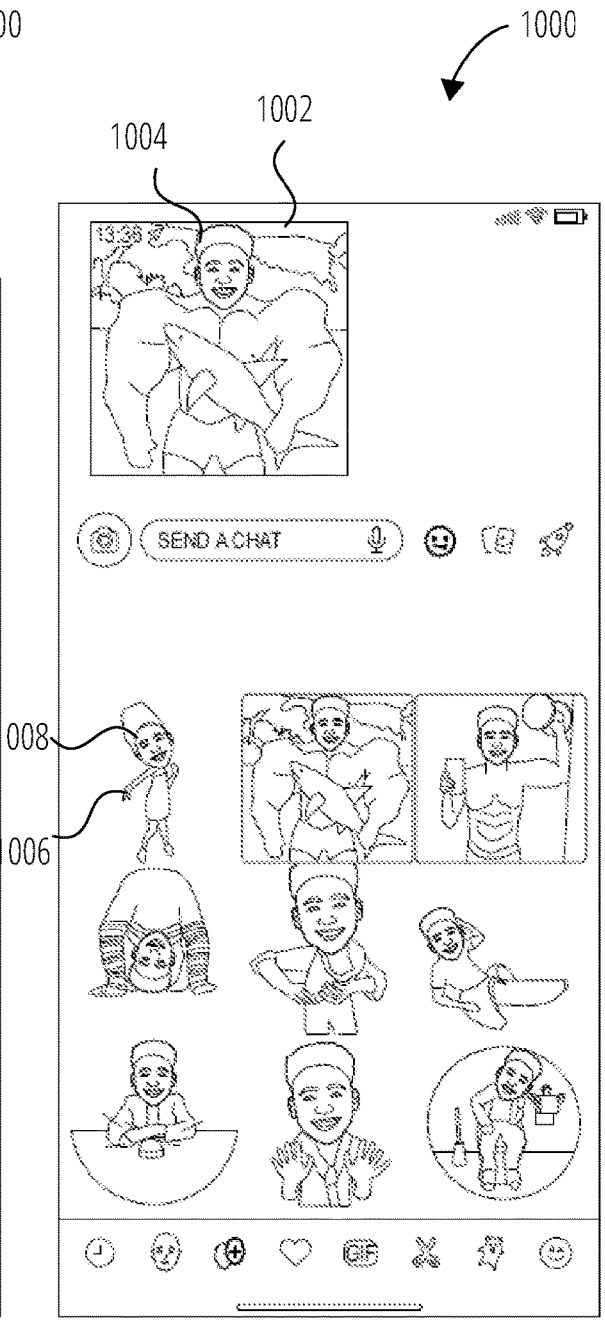
FIG. 10 is a user interface diagram illustrating updated media content items after a user successfully takes a self-image, according to some examples.

FIG. 10 is a user interface diagram 1000 illustrating media content items after a user successfully takes a self-image, according to some examples. After a user selects the selectable user interface element and captures a self-image, the media content item 1002 that was sent to the chat window is updated to include the head of the user. The system replaces the placeholder space with the head of the user 1004. The set of media content items 1006 on the apportioned section of the user interface also displays the head of the user 1008 instead of the placeholder space. The banner and the embedded user selectable user interface elements are removed from the user interface.

Figure 11:
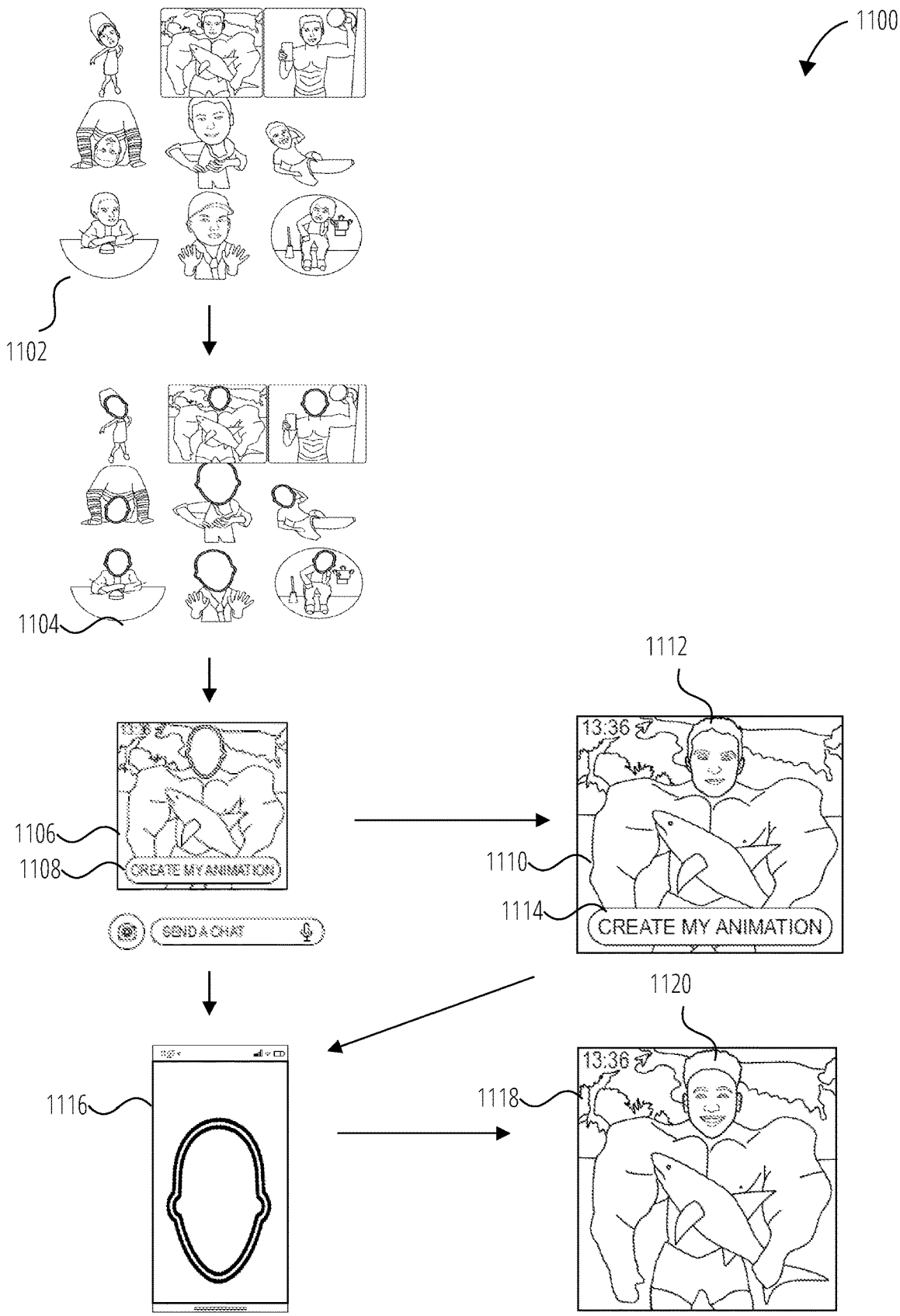
FIG. 11 illustrates a set of user interfaces that show user interfaces displayed for a user from when the user has not yet taken a self-image to when the placeholder space in a media content item is updated with the user's or another user's head, according to some examples.

FIG. 11 illustrates a set of user interfaces 1100 from when the user has not yet taken a self-image to when the placeholder spaces are updated with the user's or friend's head, according to some examples. The user interface 1102 illustrates an initial set of media content items where the heads of the original characters are shown.

The system identifies the head portion for each character in the media content items and replaces the head portion with a blank or placeholder space, as shown in user interface 1104. The user selects one of the media content items 1106 to be included in the interaction feature, such as a chat window where messages can be exchanged between a user and a friend. The media content item 1106 is displayed with a user selectable option 1108 that initiates the process of capturing a self-image of the user to use in media content items.

The system determines that the user either has taken a self-image for the purposes of use in media content items and/or has the option to use the friend's self-image. The system applies the friend's face 1112 instead of the placeholder space on the media content item 1110 that is showing on the chat window. The user selectable option 1114 for the user to take the self-image is still available for the user, since the user has not yet taken the self-image to be used in media content items.

The user selects the user selectable option 1108 or 1114 embedded within either media content items 1106 and 1110. At user interface 1116, the interaction client opens the camera system such that a user can take a self-image to be used on media content items. The interaction client blocks off certain parts of the camera feed in the shape of a user's face, such that the user would have to position the interaction client to fit within the user face. Once the user has taken a self-image, the media content item is updated to include the face of the user 1120 at user interface 1118. The user selectable options that were previously shown (e.g., 1108, 1114) are now disabled.

In some examples, the system replaces a different portion of a user's body, such as a user's eyes, ears, nose, mouth, neck, torso, chest, abdomen, pelvis, arms, shoulders, wrist, hand, forearm, leg, foot, ankle, skin, and/or the like.

Data Communications Architecture

Figure 12:
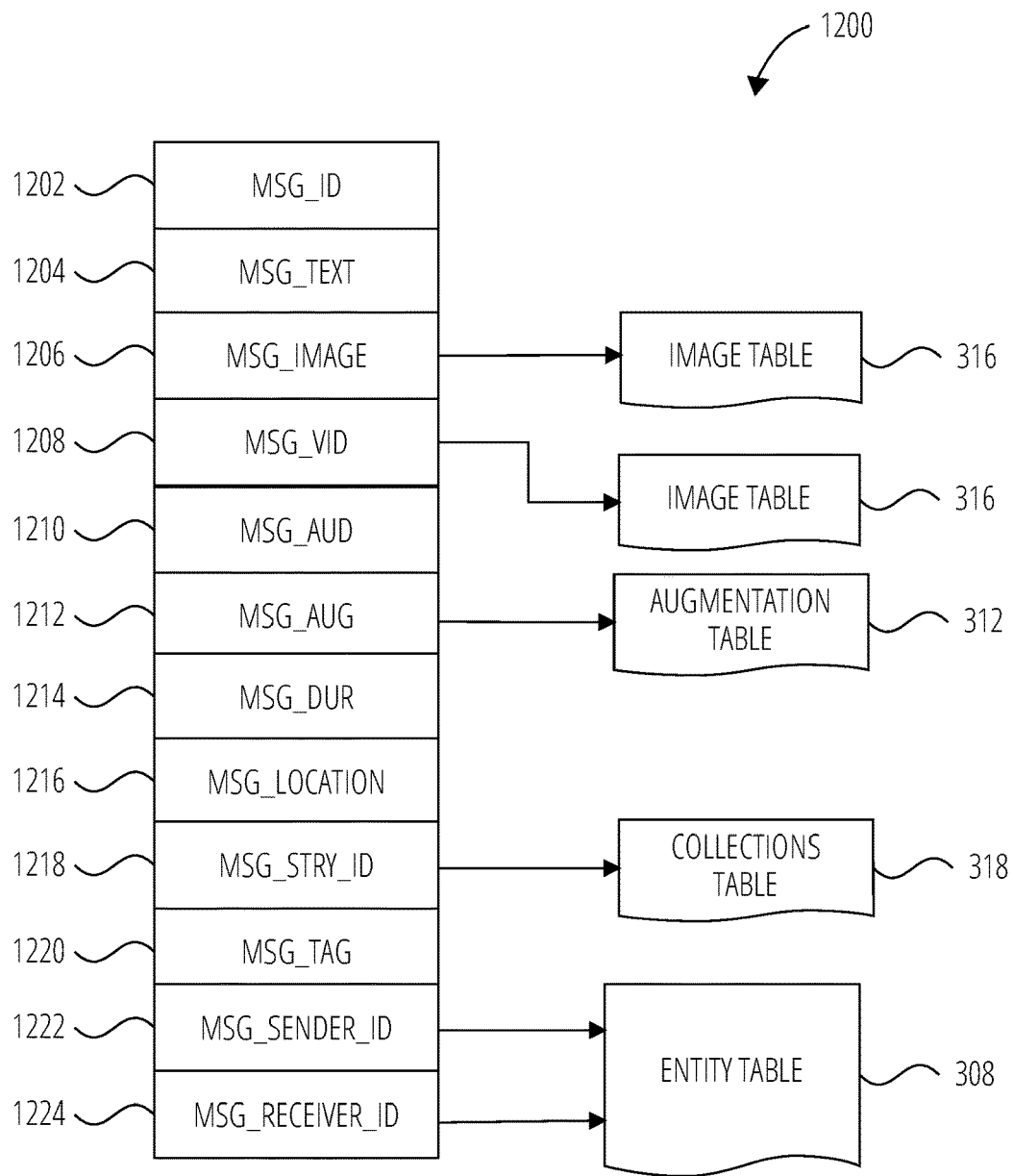
FIG. 12 is a diagrammatic representation of a message, according to some examples.

FIG. 12 is a schematic diagram illustrating a structure of a message 1200, according to some examples, generated by an interaction client 104 for communication to a further interaction client 104 via the interaction servers 124. The content of a particular message 1200 is used to populate the message table 306 stored within the database 304, accessible by the interaction servers 124. Similarly, the content of a message 1200 is stored in memory as "in-transit" or "in-flight" data of the user system 102 or the interaction servers 124. A message 1200 is shown to include the following example components:

- Message identifier 1202: a unique identifier that identifies the message 1200.
- Message text payload 1204: text, to be generated by a user via a user interface of the user system 102, and that is included in the message 1200.
- Message image payload 1206: image data, captured by a camera component of a user system 102 or retrieved from a memory component of a user system 102, and that is included in the message 1200. Image data for a sent or received message 1200 may be stored in the image table 316.
- Message video payload 1208: video data, captured by a camera component or retrieved from a memory component of the user system 102, and that is included in the message 1200. Video data for a sent or received message 1200 may be stored in the image table 316.
- Message audio payload 1210: audio data, captured by a microphone or retrieved from a memory component of the user system 102, and that is included in the message 1200.
- Message augmentation data 1212: augmentation data (e.g., filters, stickers, or other annotations or enhancements) that represents augmentations to be applied to message image payload 1206, message video payload 1208, or message audio payload 1210 of the message 1200. Augmentation data for a sent or received message 1200 may be stored in the augmentation table 312.
- Message duration parameter 1214: parameter value indicating, in seconds, the amount of time for which content of the message (e.g., the message image payload 1206, message video payload 1208, message audio payload 1210) is to be presented or made accessible to a user via the interaction client 104.
- Message geolocation parameter 1216: geolocation data (e.g., latitudinal and longitudinal coordinates) associated with the content payload of the message. Multiple message geolocation parameter 1216 values may be included in the payload, each of these parameter values being associated with respect to content items included in the content (e.g., a specific image within the message image payload 1206, or a specific video in the message video payload 1208).
- Message story identifier 1218: identifier values identifying one or more content collections (e.g., "stories" identified in the collections table 318) with which a particular content item in the message image payload 1206 of the message 1200 is associated. For example, multiple images within the message image payload 1206 may each be associated with multiple content collections using identifier values.
- Message tag 1220: each message 1200 may be tagged with multiple tags, each of which is indicative of the subject matter of content included in the message payload. For example, where a particular image included in the message image payload 1206 depicts an animal (e.g., a lion), a tag value may be included within the message tag 1220 that is indicative of the relevant animal. Tag values may be generated manually, based on user input, or may be automatically generated using, for example, image recognition.
- Message sender identifier 1222: an identifier (e.g., a messaging system identifier, email address, or device identifier) indicative of a user of the user system 102 on which the message 1200 was generated and from which the message 1200 was sent.
- Message receiver identifier 1224: an identifier (e.g., a messaging system identifier, email address, or device identifier) indicative of a user of the user system 102 to which the message 1200 is addressed.

The contents (e.g., values) of the various components of message 1200 may be pointers to locations in tables within which content data values are stored. For example, an image value in the message image payload 1206 may be a pointer to (or address of) a location within an image table 316. Similarly, values within the message video payload 1208 may point to data stored within an image or video table 316, values stored within the message augmentation data 1212 may point to data stored in an augmentation table 312, values stored within the message story identifier 1218 may point to data stored in a collections table 318, and values stored within the message sender identifier 1222 and the message receiver identifier 1224 may point to user records stored within an entity table 308.

System with Head-Wearable Apparatus

Figure 13:
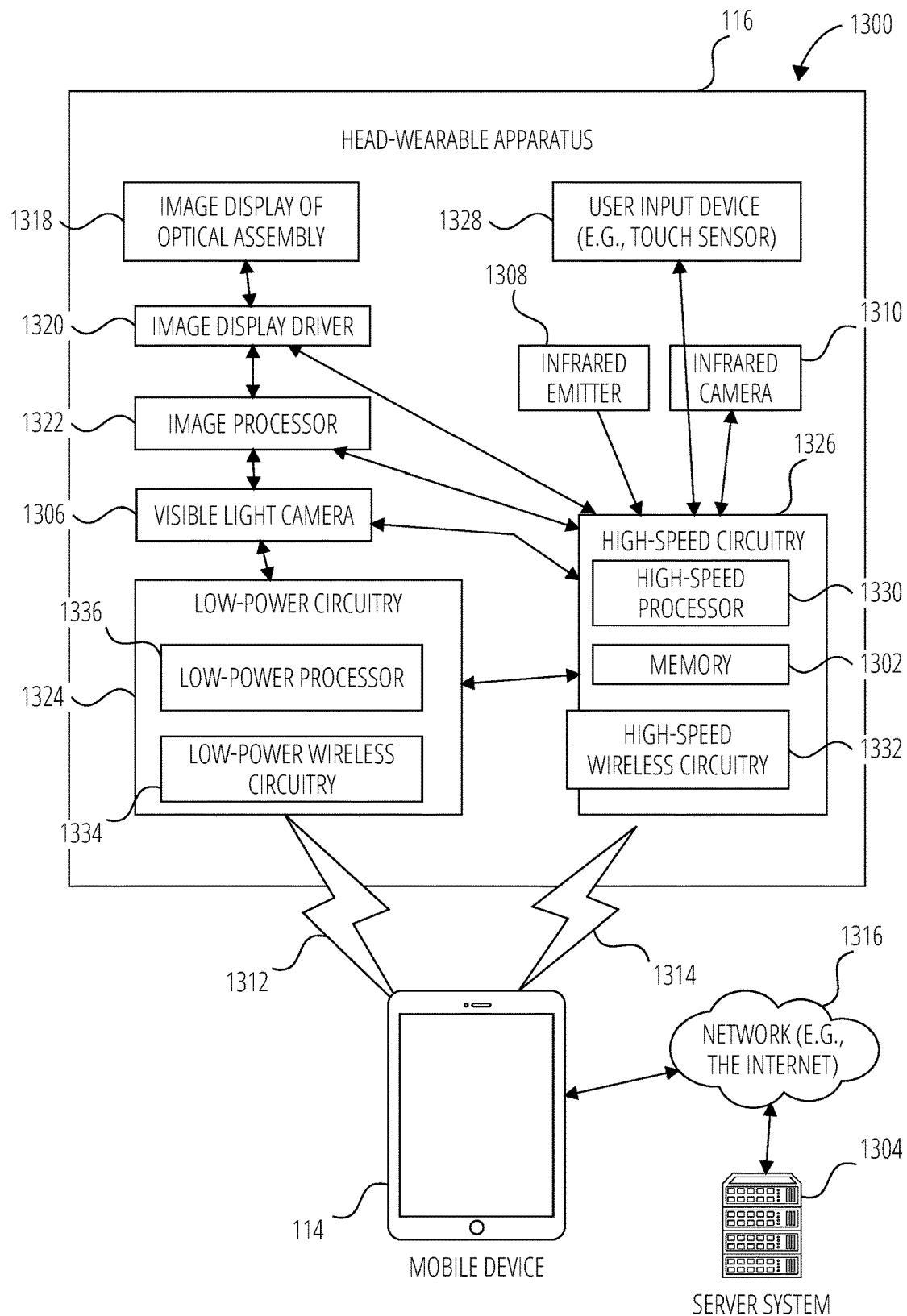
FIG. 13 illustrates a system including a head-wearable apparatus, according to some examples.

FIG. 13 illustrates a system 1300 including a head-wearable apparatus 116 with a selector input device, according to some examples. FIG. 13 is a high-level functional block diagram of an example head-wearable apparatus 116 communicatively coupled to a mobile device 114 and various server systems 1304 (e.g., the interaction server system 110) via various networks 108. The networks 108 may include any combination of wired and wireless connections.

The head-wearable apparatus 116 includes one or more cameras, each of which may be, for example, a visible light camera 1306, an infrared emitter 1308, and an infrared camera 1310.

An interaction client, such as a mobile device 114 connects with head-wearable apparatus 116 using both a low-power wireless connection 1312 and a high-speed wireless connection 1314. The mobile device 114 is also connected to the server system 1304 and the network 1316.

The head-wearable apparatus 116 further includes two image displays of the image display of optical assembly 1318. The two image displays of optical assembly 1318 include one associated with the left lateral side and one associated with the right lateral side of the head-wearable apparatus 116. The head-wearable apparatus 116 also includes an image display driver 1320, an image processor 1322, low-power circuitry 1324, and high-speed circuitry 1326. The image display of optical assembly 1318 is for presenting images and videos, including an image that can include a graphical user interface to a user of the head-wearable apparatus 116.

The image display driver 1320 commands and controls the image display of optical assembly 1318. The image display driver 1320 may deliver image data directly to the image display of optical assembly 1318 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1328 (e.g., touch sensor or push button), including an input surface on the head-wearable apparatus 116. The user input device 1328 (e.g., touch sensor or push button) is to receive from the user an input selection to manipulate the graphical user interface of the presented image.

The components shown in FIG. 13 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1306 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1302, which stores instructions to perform a subset or all of the functions described herein. The memory 1302 can also include storage device.

As shown in FIG. 13, the high-speed circuitry 1326 includes a high-speed processor 1330, a memory 1302, and high-speed wireless circuitry 1332. In some examples, the image display driver 1320 is coupled to the high-speed circuitry 1326 and operated by the high-speed processor 1330 in order to drive the left and right image displays of the image display of optical assembly 1318. The high-speed processor 1330 may be any processor capable of managing high-speed communications and operation of any general computing system needed for the head-wearable apparatus 116. The high-speed processor 1330 includes processing resources needed for managing high-speed data transfers on a high-speed wireless connection 1314 to a wireless local area network (WLAN) using the high-speed wireless circuitry 1332. In certain examples, the high-speed processor 1330 executes an operating system such as a LINUX operating system or other such operating system of the head-wearable apparatus 116, and the operating system is stored in the memory 1302 for execution. In addition to any other responsibilities, the high-speed processor 1330 executing a software architecture for the head-wearable apparatus 116 is used to manage data transfers with high-speed wireless circuitry 1332. In certain examples, the high-speed wireless circuitry 1332 is configured to implement Institute of Electrical and Electronic Engineers (IEEE) 802.11 communication standards, also referred to herein as WI-FI®. In some examples, other high-speed communications standards may be implemented by the high-speed wireless circuitry 1332.

The low-power wireless circuitry 1334 and the high-speed wireless circuitry 1332 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1312 and the high-speed wireless connection 1314, may be implemented using details of the architecture of the head-wearable apparatus 116, as can other elements of the network 1316.

The memory 1302 includes any storage device capable of storing various data and applications, including, among other things, camera data generated by the left and right visible light cameras 1306, the infrared camera 1310, and the image processor 1322, as well as images generated for display by the image display driver 1320 on the image displays of the image display of optical assembly 1318. While the memory 1302 is shown as integrated with high-speed circuitry 1326, in some examples, the memory 1302 may be an independent standalone element of the head-wearable apparatus 116. In certain such examples, electrical routing lines may provide a connection through a chip that includes the high-speed processor 1330 from the image processor 1322 or the low-power processor 1336 to the memory 1302. In some examples, the high-speed processor 1330 may manage addressing of the memory 1302 such that the low-power processor 1336 will boot the high-speed processor 1330 any time that a read or write operation involving memory 1302 is needed.

As shown in FIG. 13, the low-power processor 1336 or high-speed processor 1330 of the head-wearable apparatus 116 can be coupled to the camera (visible light camera 1306, infrared emitter 1308, or infrared camera 1310), the image display driver 1320, the user input device 1328 (e.g., touch sensor or push button), and the memory 1302.

The head-wearable apparatus 116 is connected to a host computer. For example, the head-wearable apparatus 116 is paired with the mobile device 114 via the high-speed wireless connection 1314 or connected to the server system 1304 via the network 1316. The server system 1304 may be one or more computing devices as part of a service or network computing system, for example, that includes a processor, a memory, and network communication interface to communicate over the network 1316 with the mobile device 114 and the head-wearable apparatus 116.

The mobile device 114 includes a processor and a network communication interface coupled to the processor. The network communication interface allows for communication over the network 1316, low-power wireless connection 1312, or high-speed wireless connection 1314. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image display of the optical assembly are driven by the image display driver 1320. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1304, such as the user input device 1328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1312 and high-speed wireless connection 1314 from the mobile device 114 via the low-power wireless circuitry 1334 or high-speed wireless circuitry 1332.

Machine Architecture

Figure 14:
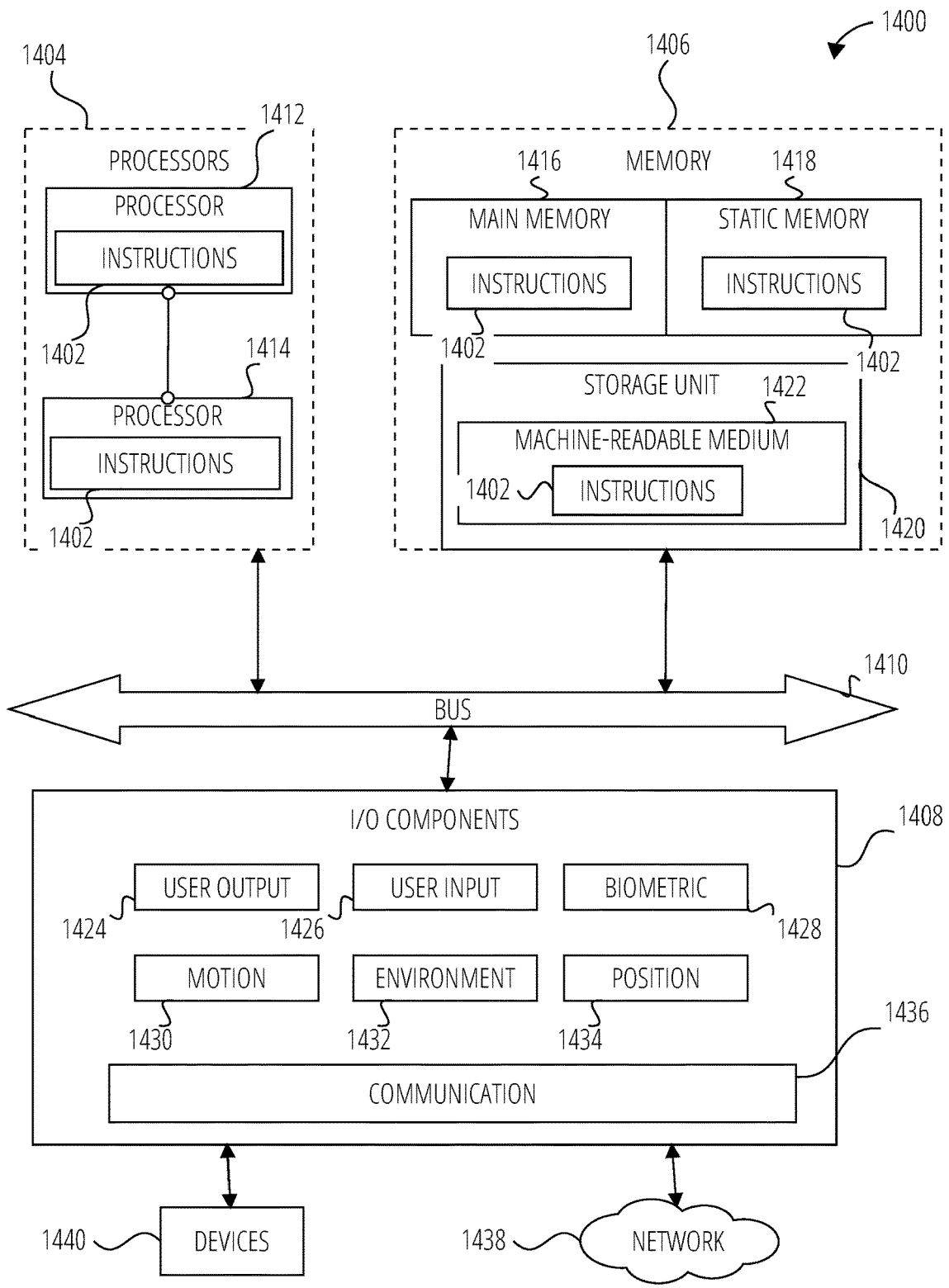
FIG. 14 is a diagrammatic representation of a machine in the form of a computer system within which a set of instructions may be executed to cause the machine to perform any one or more of the methodologies discussed herein, according to some examples.

FIG. 14 is a diagrammatic representation of the machine 1400 within which instructions 1402 (e.g., software, a program, an application, an applet, an app, or other executable code) for causing the machine 1400 to perform any one or more of the methodologies discussed herein may be executed. For example, the instructions 1402 may cause the machine 1400 to execute any one or more of the methods described herein. The instructions 1402 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1402, sequentially or otherwise, that specify actions to be taken by the machine 1400. Further, while a single machine 1400 is illustrated, the term "machine" shall also be taken to include a collection of machines that individually or jointly execute the instructions 1402 to perform any one or more of the methodologies discussed herein. The machine 1400, for example, may comprise the user system 102 or any one of multiple server devices forming part of the interaction server system 110. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1408, which may be configured to communicate with each other via a bus 1410. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1412 and a processor 1414 that execute the instructions 1402. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1416, a static memory 1418, and a storage unit 1420, both accessible to the processors 1404 via the bus 1410. The main memory 1406, the static memory 1418, and storage unit 1420 store the instructions 1402 embodying any one or more of the methodologies or functions described herein. The instructions 1402 may also reside, completely or partially, within the main memory 1416, within the static memory 1418, within machine-readable medium 1422 within the storage unit 1420, within at least one of the processors 1404 (e.g., within the processor's cache memory), or any suitable combination thereof, during execution thereof by the machine 1400.

The I/O components 1408 may include a wide variety of components to receive input, provide output, produce output, transmit information, exchange information, capture measurements, and so on. The specific I/O components 1408 that are included in a particular machine will depend on the type of machine. For example, portable machines such as mobile phones may include a touch input device or other such input mechanisms, while a headless server machine will likely not include such a touch input device. It will be appreciated that the I/O components 1408 may include many other components that are not shown in FIG. 14. In various examples, the I/O components 1408 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1408 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1430 include acceleration sensor components (e.g., accelerometer), gravitation sensor components, and rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1408 further include communication components 1436 operable to couple the machine 1400 to a network 1438 or devices 1440 via respective coupling or connections. For example, the communication components 1436 may include a network interface component or another suitable device to interface with the network 1438. In further examples, the communication components 1436 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1440 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1416, static memory 1418, and memory of the processors 1404) and storage unit 1420 may store one or more sets of instructions and data structures (e.g., software) embodying or used by any one or more of the methodologies or functions described herein. These instructions (e.g., the instructions 1402), when executed by processors 1404, cause various operations to implement the disclosed examples.

The instructions 1402 may be transmitted or received over the network 1438, using a transmission medium, via a network interface device (e.g., a network interface component included in the communication components 1436) and using any one of several well-known transfer protocols (e.g., hypertext transfer protocol (HTTP)). Similarly, the instructions 1402 may be transmitted or received using a transmission medium via a coupling (e.g., a peer-to-peer coupling) to the devices 1440.

Software Architecture

Figure 15:
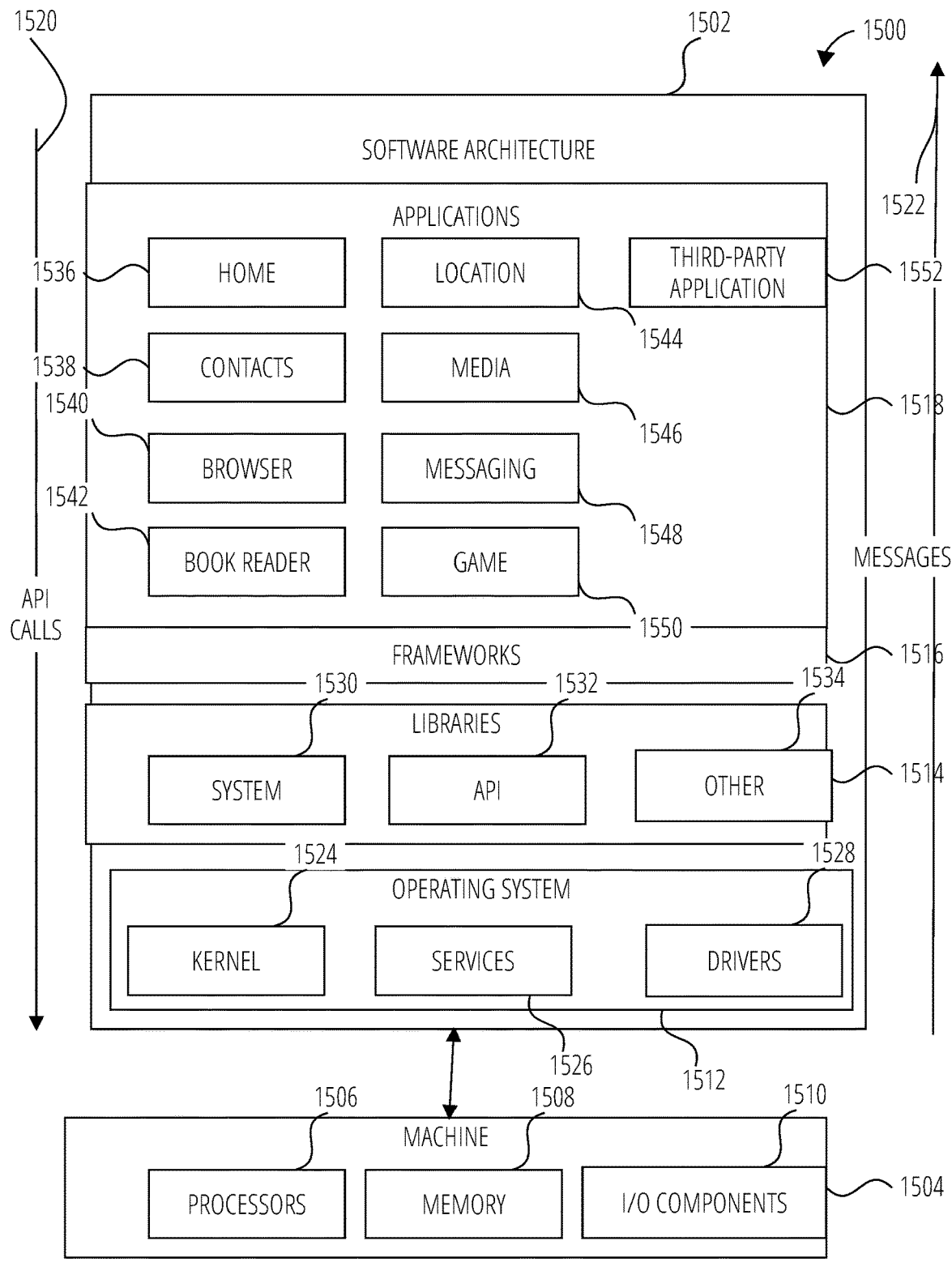
FIG. 15 is a block diagram showing a software architecture within which examples may be implemented.

FIG. 15 is a block diagram 1500 illustrating a software architecture 1502, which can be installed on any one or more of the devices described herein. The software architecture 1502 is supported by hardware such as a machine 1504 that includes processors 1506, memory 1508, and I/O components 1510. In this example, the software architecture 1502 can be conceptualized as a stack of layers, where each layer provides a particular functionality. The software architecture 1502 includes layers such as an operating system 1512, libraries 1514, frameworks 1516, and applications 1518. Operationally, the applications 1518 invoke API calls 1520 through the software stack and receive messages 1522 in response to the API calls 1520.

The operating system 1512 manages hardware resources and provides common services. The operating system 1512 includes, for example, a kernel 1524, services 1526, and drivers 1528. The kernel 1524 acts as an abstraction layer between the hardware and the other software layers. For example, the kernel 1524 provides memory management, processor management (e.g., scheduling), component management, networking, and security settings, among other functionalities. The services 1526 can provide other common services for the other software layers. The drivers 1528 are responsible for controlling or interfacing with the underlying hardware. For instance, the drivers 1528 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1514 provide a common low-level infrastructure used by the applications 1518. The libraries 1514 can include system libraries 1530 (e.g., C standard library) that provide functions such as memory allocation functions, string manipulation functions, mathematic functions, and the like. In addition, the libraries 1514 can include API libraries 1532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1514 can also include a wide variety of other libraries 1534 to provide many other APIs to the applications 1518.

The frameworks 1516 provide a common high-level infrastructure that is used by the applications 1518. For example, the frameworks 1516 provide various graphical user interface (GUI) functions, high-level resource management, and high-level location services. The frameworks 1516 can provide a broad spectrum of other APIs that can be used by the applications 1518, some of which may be specific to a particular operating system or platform.

In an example, the applications 1518 may include a home application 1536, a contacts application 1538, a browser application 1540, a book reader application 1542, a location application 1544, a media application 1546, a messaging application 1548, a game application 1550, and a broad assortment of other applications such as a third-party application 1552. The applications 1518 are programs that execute functions defined in the programs. Various programming languages can be employed to create one or more of the applications 1518, structured in a variety of manners, such as object-oriented programming languages (e.g., Objective-C, Java, or C++) or procedural programming languages (e.g., C or assembly language). In a specific example, the third-party application 1552 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1552 can invoke the API calls 1520 provided by the operating system 1512 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: determining participation in an interaction function by a first user of an interaction system with a second user of the interaction system; accessing profile data of the first user; determining, based on the profile data, whether the first user has captured or designated a first-user self-image for use in the interaction function; and in response to determining that the first user has not captured or designated the first-user self-image: accessing a media content item that includes, a character; identifying a head portion of the character in the media content item; replacing the head portion with a placeholder space; and displaying the media content item with the placeholder space in a user interface corresponding to the interaction function.

In Example 2, the subject matter of Example 1 includes, wherein the operations further comprise, subsequent to displaying the media content item with the placeholder space: determining that the first user has captured or designated the first-user self-image; and in response to determining that the first user has captured or designated the first-user self-image, replacing the placeholder space with a head image of the first user in the user interface corresponding to the interaction function.

In Example 3, the subject matter of Examples 1-2 includes, wherein the operations further comprise determining that a second user has not captured or designated a second-user self-image, wherein replacing the head portion with the placeholder space is further in response to determining that the second user has not captured or designated the second-user self-image.

In Example 4, the subject matter of Examples 1-3 includes, wherein the operations further comprise determining, from profile data of a second user, that the second user has captured or designated a second-user self-image but has not enabled other users to use the second-user self-image, wherein replacing the head portion with the placeholder space is further in response to determining, from profile data of the second user, that the second user has not enabled other users to use the second-user self-image.

In Example 5, the subject matter of Examples 1~4 includes, wherein the operations further comprise, subsequent to displaying the media content item with the placeholder space: determining that a second user captured or designated a second-user self-image; and in response to determining that the second user captured or designated the second-user self-image, replacing the placeholder space with the second-user self-image.

In Example 6, the subject matter of Examples 1-5 includes, wherein the interaction function includes a chat window configured to display exchanged messages between the first and second users.

In Example 7, the subject matter of Example 6 includes, wherein displaying the media content item includes: reducing a size of the chat window in the user interface; and apportioning unused user interface space for display of the media content item.

In Example 8, the subject matter of Examples 6-7 includes, wherein the operations further include, subsequent to displaying the media content item with the placeholder space: identifying a user selection of the media content item from a set of media content items being displayed in the user interface; and in response to the user selection, causing presentation of the selected media content item in the chat window at a first interaction client of the first user and a second interaction client of the second user.

In Example 9, the subject matter of Example 8 includes, wherein the operations further include, subsequent to displaying the selected media content item in the chat window: determining that the second user captured or designated a second-user self-image; and in response determining that the second user captured or designated the second-user self-image, replacing the placeholder space in the media content item that is displayed in the chat window with a head portion of the captured or designated second-user self-image.

In Example 10, the subject matter of Examples 1-9 includes, wherein the operations further include: displaying a selectable user interface element that initiates a camera feed from a camera system of a first interaction client of the first user to capture the first-user self-image, wherein the selectable user interface element is disposed adjacent to or embedded at least partially within the displayed media content item.

In Example 11, the subject matter of Example 10 includes, wherein the operations further include: displaying a message between the first and second users subsequent to displaying the media content item with the placeholder space, wherein the message is displayed below the displayed media content item, wherein the selectable user interface element moves along the user interface with the displayed media content item.

In Example 12, the subject matter of Examples 1-11 includes, wherein the operations further include disabling an option to save the media content item onto the at least one memory component.

In Example 13, the subject matter of Examples 1-12 includes, wherein the operations further comprise, subsequent to displaying the media content item with the placeholder space: determining that the first user captured or designated the first-user self-image using a first interaction client of the first user; determining the second user captured or designated a second-user self-image of the second user using a second interaction client of the second user; and in response to determining that the first user and second user captured or designated the first-user self-image and second-user self-image, respectively: identifying a media content item with two characters; replacing a head portion for a first character identified in the media content item with a head portion of the first user; replacing a head portion for a second character identified in the media content item with a head portion of the second user; and displaying the media content item with the replaced head portion of the first user and the replaced head portion of the second user for the interaction function.

In Example 14, the subject matter of Examples 1-13 includes, wherein the operations further comprise displaying a search bar configured to initiate a search for other media content items that include a placeholder space for the head portion.

In Example 15, the subject matter of Examples 1-14 includes, wherein the operations further comprise filtering out media content items that include a plurality of head portions or media content items that are specific to a particular gender or age group for said accessing of the media content item.

In Example 16, the subject matter of Examples 1-15 includes, wherein the interaction function comprises a user selectable user interface element configured to enable the first user to subscribe to a channel of the second user.

In Example 17, the subject matter of Examples 1-16 includes, wherein the interaction function comprises an online post, wherein the operations further comprise displaying one or more online posts from the second user, wherein the one or more online posts include the media content item with the placeholder space.

In Example 18, the subject matter of Examples 1-17 includes, wherein the media content item includes a static image or an animation.

Example 19 is a method comprising: determining participation in an interaction function by a first user of an interaction system with a second user of the interaction system; accessing profile data of the first user; determining, based on the profile data, whether the first user has captured or designated a first-user self-image for use in the interaction function; and in response to determining that the first user has not captured or designated the first-user self-image: accessing a media content item that includes, a character; identifying a head portion of the character in the media content item; replacing the head portion with a placeholder space; and displaying the media content item with the placeholder space in a user interface corresponding to the interaction function.

Example 20 is a non-transitory computer-readable storage medium storing instructions that, when executed by at least one processor, cause the at least one processor to perform operations comprising: determining participation in an interaction function by a first user of an interaction system with a second user of the interaction system; accessing profile data of the first user; determining, based on the profile data, whether the first user has captured or designated a first-user self-image for use in the interaction function; and in response to determining that the first user has not captured or designated the first-user self-image: accessing a media content item that includes, a character; identifying a head portion of the character in the media content item; replacing the head portion with a placeholder space; and displaying the media content item with the placeholder space in a user interface corresponding to the interaction function.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
   at least one processor; and
   at least one memory component storing instructions that, when executed by the at least one processor, cause the at least one processor to perform operations comprising:
   determining participation in an interaction function by a first user of an interaction system with a second user of the interaction system;
   accessing profile data of the first user;
   determining, based on the profile data of the first user, whether the first user has captured or designated a first-user self-image for use in the interaction function; and
   in response to determining that the first user has not captured or designated the first-user self-image:
   accessing a media content item that includes a character;
   identifying a head portion of the character in the media content item;
   determining, from profile data of the second user, that the second user has captured or designated a second-user self-image but has not enabled other users to use the second-user self-image;
   in response to determining, from the profile data of the second user, that the second user has not enabled other users to use the second-user self-image:
   replacing the head portion with a placeholder space; and
   displaying the media content item with the placeholder space in a user interface corresponding to the interaction function.

2. The system of claim 1, wherein the operations further comprise, subsequent to displaying the media content item with the placeholder space:
   determining that the first user has captured or designated the first-user self-image; and
   in response to determining that the first user has captured or designated the first-user self-image, replacing the placeholder space with a head portion of the first-user self-image in the user interface corresponding to the interaction function.

3. The system of claim 1, wherein the operations further comprise determining that a second user has not captured or designated a second-user self-image, wherein replacing the head portion with the placeholder space is further in response to determining that the second user has not captured or designated the second-user self-image.

4. The system of claim 1, wherein the operations further comprise,
   subsequent to displaying the media content item with the placeholder space:
   determining that a third user captured or designated a third-user self-image; and
   in response to determining that the second user captured or designated the third-user self-image, replacing the placeholder space with the third-user self-image, wherein the third user is also participating in the interaction function.

5. The system of claim 1, wherein the interaction function includes a chat window configured to display exchanged messages between the first and second users.

6. The system of claim 5, wherein displaying the media content item includes:
   reducing a size of the chat window in the user interface; and
   apportioning unused user interface space for display of the media content item.

7. The system of claim 5, wherein the operations further include, subsequent to displaying the media content item with the placeholder space:
   identifying a user selection of the media content item from a set of media content items being displayed in the user interface; and
   in response to the user selection, causing presentation of the selected media content item in the chat window at a first interaction client of the first user and a second interaction client of the second user.

8. The system of claim 7, wherein the operations further include, subsequent to displaying the selected media content item in the chat window:
   determining that the second user has enabled other users to use the second-user self-image; and
   in response determining that the second user has enabled other users to use the second-user self-image, replacing the placeholder space in the media content item that is displayed in the chat window with a head portion of the captured or designated second-user self-image.

9. The system of claim 1, wherein the operations further include: displaying a selectable user interface element that initiates a camera feed from a camera system of a first interaction client of the first user to capture the first-user self-image, wherein the selectable user interface element is disposed adjacent to or embedded at least partially within the displayed media content item.

10. The system of claim 9, wherein the operations further include:
    displaying a message between the first and second users subsequent to displaying the media content item with the placeholder space, wherein the message is displayed below the displayed media content item, wherein the selectable user interface element moves along the user interface with the displayed media content item.

11. The system of claim 1, wherein the operations further include disabling an option to save the media content item onto the at least one memory component.

12. The system of claim 1, wherein the operations further comprise displaying a search bar configured to initiate a search for other media content items that include a placeholder space for the head portion.

13. The system of claim 1, wherein the operations further comprise filtering out media content items that include a plurality of head portions or media content items that are specific to a particular gender or age group for said accessing of the media content item.

14. The system of claim 1, wherein the interaction function comprises a user selectable user interface element configured to enable the first user to subscribe to a channel of the second user.

15. The system of claim 1, wherein the interaction function comprises an online post, wherein the operations further comprise displaying one or more online posts from the second user, wherein the one or more online posts include the media content item with the placeholder space.

16. The system of claim 1, wherein the media content item includes a static image or an animation.

17. A method comprising:
   determining participation in an interaction function by a first user of an interaction system with a second user of the interaction system;
   accessing profile data of the first user;
   determining, based on the profile data of the first user, whether the first user has captured or designated a first-user self-image for use in the interaction function; and
   in response to determining that the first user has not captured or designated the first-user self-image:
      accessing a media content item that includes a character;
      identifying a head portion of the character in the media content item;
      determining, from profile data of the second user, that the second user has captured or designated a second-user self-image but has not enabled other users to use the second-user self-image;
      in response to determining, from the profile data of the second user, that the second user has not enabled other users to use the second-user self-image:
   replacing the head portion with a placeholder space; and
      displaying the media content item with the placeholder space in a user interface corresponding to the interaction function.

18. A non-transitory computer-readable storage medium storing instructions that, when executed by at least one processor, cause the at least one processor to perform operations comprising:
   determining participation in an interaction function by a first user of an interaction system with a second user of the interaction system;
   accessing profile data of the first user;
   determining, based on the profile data, whether the first user has captured or designated a first-user self-image for use in the interaction function; and
   in response to determining that the first user has not captured or designated the first-user self-image:
      accessing a media content item that includes a character;
      identifying a head portion of the character in the media content item;
      replacing the head portion with a placeholder space;
      displaying the media content item with the placeholder space in a user interface corresponding to the interaction function;
   determining that the first user captured or designated the first-user self-image using a first interaction client of the first user;
   determining the second user captured or designated a second-user self-image of the second user using a second interaction client of the second user; and
   in response to determining that the first user and the second user captured or designated the first-user self-image and the second-user self-image, respectively:
      identifying a media content item with two characters;
      replacing a head portion for a first character identified in the media content item with a head portion of the first-user self-image;
      replacing a head portion for a second character identified in the media content item with a head portion of the second-user self-image; and
      displaying the media content item with the replaced head portion of the first-user self-image and the replaced head portion of the second-user self-image for the interaction function.

\* \* \* \* \*